US010786081B1

(12) United States Patent
Levin

(10) Patent No.: US 10,786,081 B1
(45) Date of Patent: Sep. 29, 2020

(54) CONNECTOR MECHANISM FOR A BOAT CHAIR, A BOAT CHAIR INCORPORATING THE CONNECTOR MECHANISM, A BOAT INCLUDING THE BOAT CHAIR WITH THE CONNECTOR MECHANISM, AND/OR METHODS OF MAKING AND/OR RETROFITTING BOAT CHAIRS WITH THE SAME

(71) Applicant: Eric Martin Levin, Severna Park, MD (US)

(72) Inventor: Eric Martin Levin, Severna Park, MD (US)

( * ) Notice: Subject to any disclaimer, the term of this patent is extended or adjusted under 35 U.S.C. 154(b) by 0 days.

(21) Appl. No.: 15/880,378

(22) Filed: Jan. 25, 2018

(51) Int. Cl.
*A47C 7/38* (2006.01)
*B63B 29/04* (2006.01)
*A47C 1/024* (2006.01)
*A47C 7/42* (2006.01)
*F16B 21/12* (2006.01)

(52) U.S. Cl.
CPC ............ *A47C 1/0246* (2013.01); *A47C 7/383* (2013.01); *A47C 7/42* (2013.01); *B63B 29/04* (2013.01); *F16B 21/12* (2013.01); *B63B 2029/043* (2013.01)

(58) Field of Classification Search
CPC ..... Y10T 403/32286; Y10T 403/32336; Y10T 403/32319; Y10T 403/32262; A47C 7/38; A47C 7/383; A47C 1/0246; B63B 2029/043; B60N 2/841
USPC .................................................... 297/354.11
See application file for complete search history.

(56) References Cited

U.S. PATENT DOCUMENTS

| 3,215,468 | A | * | 11/1965 | Swenson | A47C 7/445 297/284.1 |
| 3,347,572 | A | * | 10/1967 | Pfaff, Jr. | E04H 12/24 403/27 |
| 3,741,595 | A | * | 6/1973 | Horgan, Jr. | F16B 7/00 403/59 |
| 4,463,632 | A | * | 8/1984 | Parke | B25G 1/063 403/93 |
| 4,926,783 | A | | 5/1990 | Lathers | |
| 5,697,318 | A | | 12/1997 | Kobayashi | |
| 5,904,398 | A | * | 5/1999 | Farricielli | A61G 5/00 297/296 |
| 6,135,476 | A | * | 10/2000 | Dickie | A61G 5/045 280/250.1 |
| 6,283,059 | B1 | | 9/2001 | Scully, Jr. | |
| 6,322,145 | B1 | * | 11/2001 | Melgarejo | A61G 5/1067 16/374 |
| 6,513,876 | B1 | * | 2/2003 | Agler | B60N 2/206 297/378.12 |
| 6,527,341 | B1 | | 3/2003 | Martin | |
| 6,880,482 | B2 | | 4/2005 | Huse | |
| 6,983,992 | B2 | * | 1/2006 | Oomori | B62J 1/12 297/352 |
| 7,066,548 | B2 | | 6/2006 | Butler | |
| 7,107,927 | B2 | | 9/2006 | Hopper | |
| 7,125,079 | B1 | * | 10/2006 | Lee | A47C 3/18 297/353 |

(Continued)

*Primary Examiner* — Timothy J Brindley
(74) *Attorney, Agent, or Firm* — Garcia-Zamor IP Law; Ruy M. Garcia-Zamor

(57) ABSTRACT

A connector mechanism for boats that can be retrofit into existing seats or manufactured therewith which preferably allows a person to recline and lounge in a boat chair that may have previously only been suited for sitting upright.

9 Claims, 24 Drawing Sheets

(56) References Cited

U.S. PATENT DOCUMENTS

| | | | |
|---|---|---|---|
| 7,367,616 B2 | 5/2008 | Summerford | |
| 8,960,799 B2* | 2/2015 | Yoon | A47C 1/146 |
| | | | 297/378.1 |
| 9,021,975 B1 | 5/2015 | Fodor | |
| 9,138,059 B2* | 9/2015 | Kwok | A47C 4/18 |
| 10,182,953 B2* | 1/2019 | Tsuber | A61G 5/1067 |
| 2004/0184895 A1* | 9/2004 | Liao | F16C 11/103 |
| | | | 411/87 |
| 2005/0179288 A1* | 8/2005 | Lizaso | A47C 1/12 |
| | | | 297/250.1 |
| 2006/0033375 A1* | 2/2006 | Wu | A47C 7/38 |
| | | | 297/408 |
| 2006/0202536 A1* | 9/2006 | Luchetti | A47C 1/023 |
| | | | 297/354.11 |
| 2008/0035047 A1* | 2/2008 | McDonough | B63B 29/00 |
| | | | 114/357 |
| 2010/0037814 A1 | 2/2010 | Sahr | |
| 2012/0155949 A1* | 6/2012 | Chang | F16M 11/2021 |
| | | | 403/84 |
| 2013/0093232 A1* | 4/2013 | Lin | A47C 7/38 |
| | | | 297/397 |

* cited by examiner

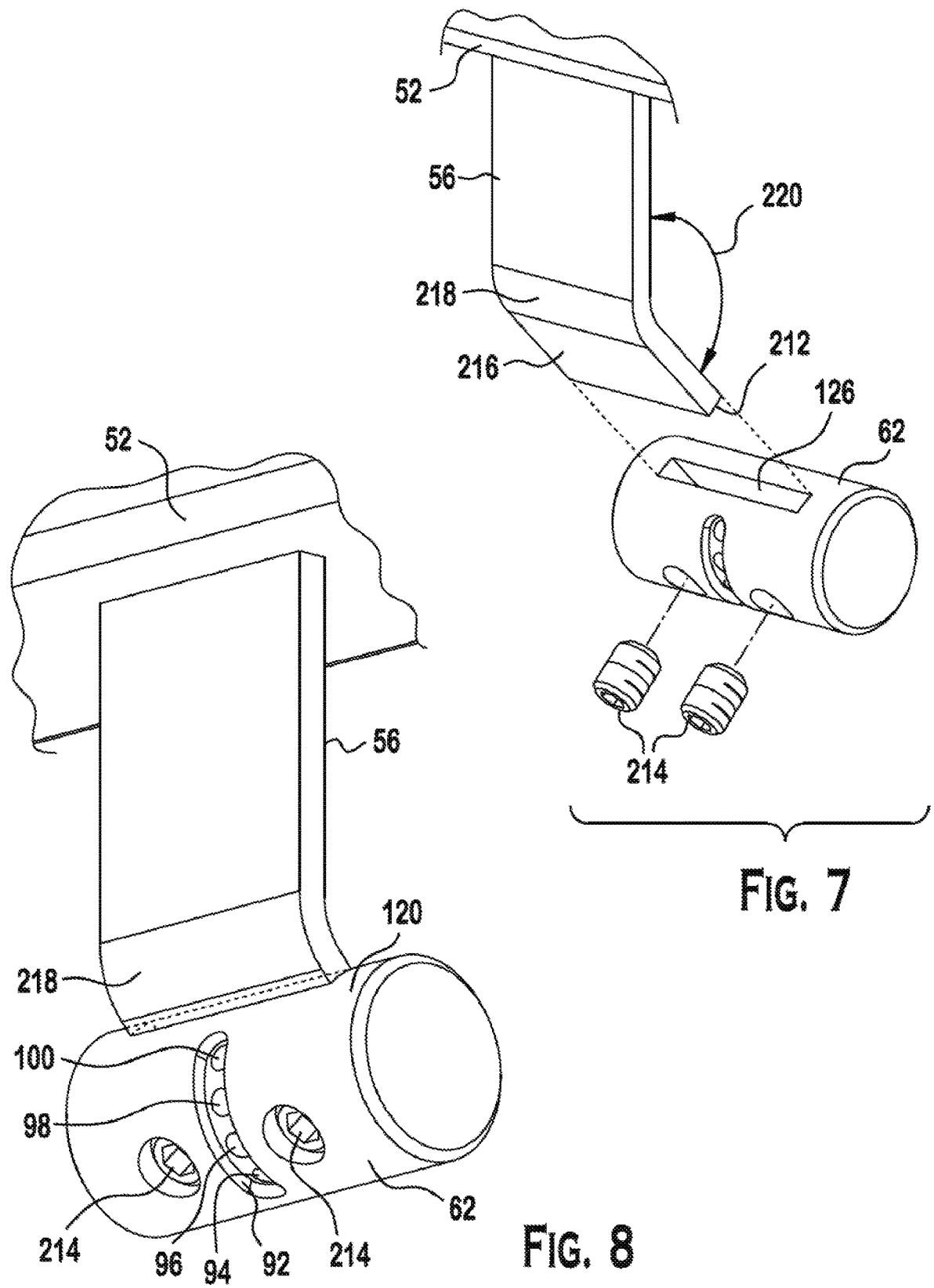

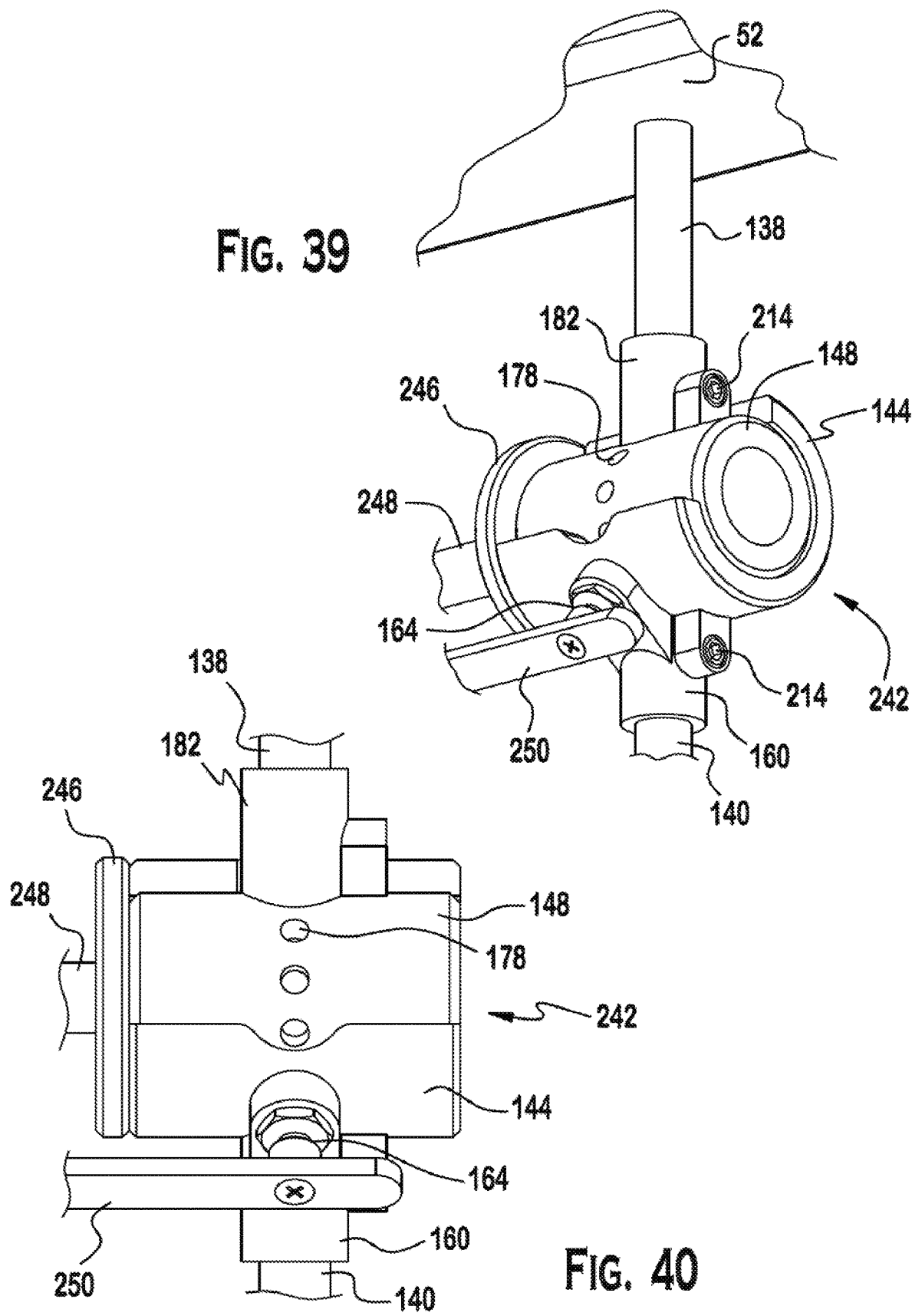

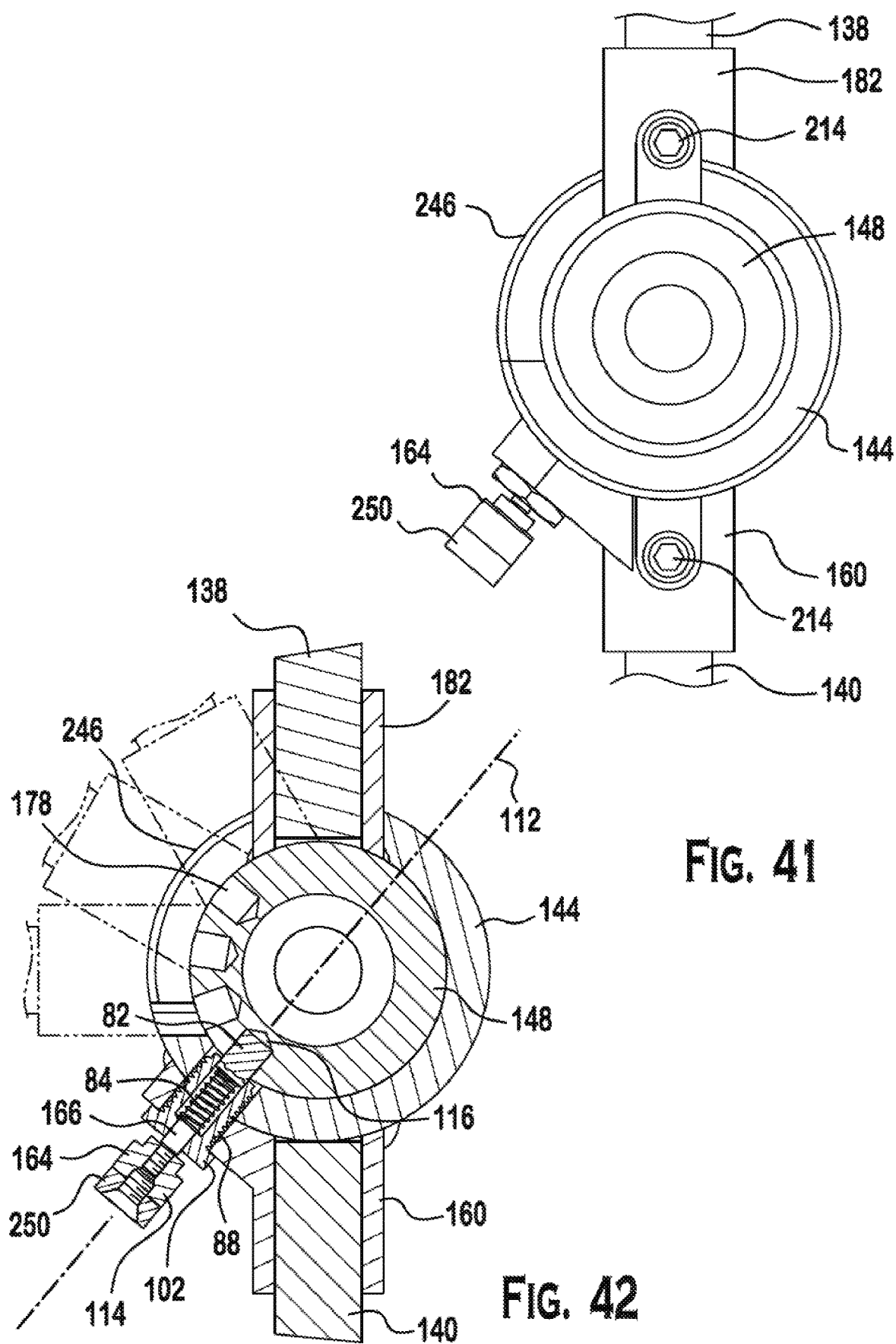

CONNECTOR MECHANISM FOR A BOAT CHAIR, A BOAT CHAIR INCORPORATING THE CONNECTOR MECHANISM, A BOAT INCLUDING THE BOAT CHAIR WITH THE CONNECTOR MECHANISM, AND/OR METHODS OF MAKING AND/OR RETROFITTING BOAT CHAIRS WITH THE SAME

BACKGROUND

The present invention relates generally to boat chairs and more specifically to a connector mechanisms for boat chairs.

People enjoy and pursue boating for many different reasons. Some boaters like to fish or hunt from boats. Some boaters like to picnic, lounge, or otherwise tour on boats. Boat owners typically enjoy being able to meet any of the preferences of guests on their boat. Unfortunately, the limited size of many boats and lack of accessories often forces boat owners to choose which purposes for which their boat will be best suited prior to purchase.

It may be advantageous to provide a connector mechanism for boats that can: be retrofit into existing seats or manufactured therewith; allow a person to recline and lounge in a boat chair that previously was only capable of supporting a person in an uptight seated position; that allows an amount of area for fishing to be maximized when not lounging; that is heavy duty, and well suited for use in rough water; that is easy to operate; and/or that is efficient to manufacture.

SUMMARY

Briefly speaking; one embodiment of the present invention is directed towards a connector mechanism for a back support structure of a boat chair. The back support structure may, have a post configured to connect to a seat on a boat. The post can be formed by a first post segment and a second post segment. The connector mechanism includes a sleeve enclosing a central axis. The sleeve can be configured to engage the second post segment. An indexing core is rotatably positioned within the sleeve for rotation about the central axis. The indexing core may be configured to engage the first post segment. A locking mechanism is configured to detachably secure the position of the indexing core relative to the sleeve such that an angle between the first post segment and the second post segment can be secured in one of a plurality of positions.

In a separate aspect, the present invention is directed towards a connector mechanism for a back support structure of a boat chair. The back support structure has a first post and a second post each configured to connect to a seat on a boat. The first post including a first post segment and a second post segment and the second post including a third post segment and a fourth post segment. The connector mechanism includes a first sleeve enclosing a central axis. The first sleeve being configured to engage the second post segment. A second sleeve enclosing the central axis. The second sleeve being configured to engage the fourth post segment. A first indexing core rotatably positioned within the first sleeve for rotation about the central axis. The first indexing core being configured to engage the first post segment. A second indexing core rotatably positioned within the first sleeve for rotation about the central axis, the second indexing core being configured to engage the third post segment. A locking mechanism configured to detachably secure the position of the first indexing core relative to the first sleeve and to detachably secure the position of second indexing core relative to the second sleeve such that a first angle between the first post segment and the second post segment and such that a second angle between the third post segment and the fourth post segment can be secured in one of a plurality of positions.

In a separate aspect, the present invention is directed toward a method of retrofitting an existing boat chair having an inflexible post to form a boat chair capable of being positioned for sitting or lounging. The method including the steps of: providing the existing boat chair having a back support structure connected to a seat support structure by an inflexible post; making at least one cut in the in flexible post to create a first post segment that is still connected to the back support structure and a second post segment; providing a sleeve enclosing a central axis, the sleeve being configured to engage the second post segment; securing the second post segment to the sleeve; providing an indexing core rotatably positioned within the sleeve for rotation about the central axis, the indexing core being configured to engage the first post segment; securing the first post segment to the indexing core; providing a locking mechanism configured to detachably secure the position of the indexing core relative to the sleeve such that an angle between the first post segment and the second post segment can be secured in one of a plurality of positions.

In a separate aspect the present invention is directed towards a connector mechanism for a back support structure of a boat chair. The connector mechanism may include: a sleeve enclosing a central axis. The sleeve can be configured to engage a second plate configured to attach to a slat or a flat portion of the boat chair. An indexing core is rotatably positioned within the sleeve for rotation about the central axis. The indexing core may be configured to engage a first plate configured to attached to a slat or flat portion of a boat chair. A locking mechanism is configured to detachably secure the position of the indexing core relative to the sleeve such that an angle between a back support structure of the boat chair and a seat support structure of the boat chair can be secured in one of a plurality of positions.

BRIEF DESCRIPTION OF THE DRAWINGS

The foregoing summary, as well as the following detailed description of the preferred embodiments of the present invention, will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings:

FIG. 7 is directed to a third step in the preferred method of retrofitting and illustrates a perspective view of the first post segment 56 aligned for insertion into a core bore 222 of an indexing core 62. A free end 212 of the first post segment 56 is inserted into the core bore 222 and is preferably detachably secured therein by set screws 214 which contact a bearing surface 216 of the first post segment 56. The first post segment 56 preferably includes a bend 218 such that the first post segment extends through an angle 220.

FIG. 8 is a perspective view of the components of FIG. 7 illustrating the first post segment 56 detachably secured within the indexing core 62 after being inserted into the core bore 222 and secured therein via set screws 214. The indexing core 62 may also include a core slot 92 which preferably extends generally circumferentially along an outer core surface 120. It is further preferred that the core slot 92 include a plurality of pinholes 94, 96, 98, 100 along the bottom of the core slot 92. The dashed line in FIG. 8 illustrates a portion of the outer surface 120 of the indexing core that is blocked from view by the first post segment 56.

FIG. 13 also illustrates a preferred fourth step in a preferred method of retrofitting a boat chair 190 to include the connector mechanism 50. The sleeve 60 preferably includes a mounting housing 72. The mounting housing 72 may be generally rectilinear or have any other shape without departing from the scope of the present invention. The mounting housing 72 preferably includes a mounting slot 74 which is configured to receive an end of the second post segment 58 therein. The second post segment 58 is preferably detachably secured within the mounting slot 74 of the mounting housing 72 via set screws 214 that are inserted into fastener holes 226. The fastener holes 226 may include bossing 228 therearound which may form an annular ring/collar shape. Those of ordinary skill in the art will appreciate from this disclosure that the second post segment 58 can be permanently affixed to the sleeve 60 without departing from the scope of the present invention.

FIG. 20 also illustrates a sixth preferred step according to a preferred embodiment of a method of retrofitting a boat chair to include the connector mechanism 50. The sixth step preferably includes inserting the biased pin assembly 76 into the assembly bore 230 to secure the indexing core 62 within the sleeve 60. The biased pin assembly 76 is preferably threadably engaged with the assembly bore 230.

FIGS. 25 and 26 illustrate two different positions into which a boat chair incorporating the connector mechanism 50 can be positioned.

FIG. 39 is a broken away perspective view of the second connector subassembly 242 of the present invention. The second sleeve 144 preferably includes a second mounting housing 160 which receives the forth post segment 140. The second indexing core 148 preferably includes a second core extension 182.

FIG. 40 is a rear side elevational view of the second connector subassembly 242 of FIG. 39 according to the present inventio.

FIG. 41 is a right side elevational view of the second connector subassembly 242 of FIG. 39 according to the present invention.

FIG. 42 is a cross-sectional view of the second connector subassembly 242 of FIG. 41 as taken through the biased pin assembly.

DETAILED DESCRIPTION OF THE PREFERRED EMBODIMENTS

Figure 1:
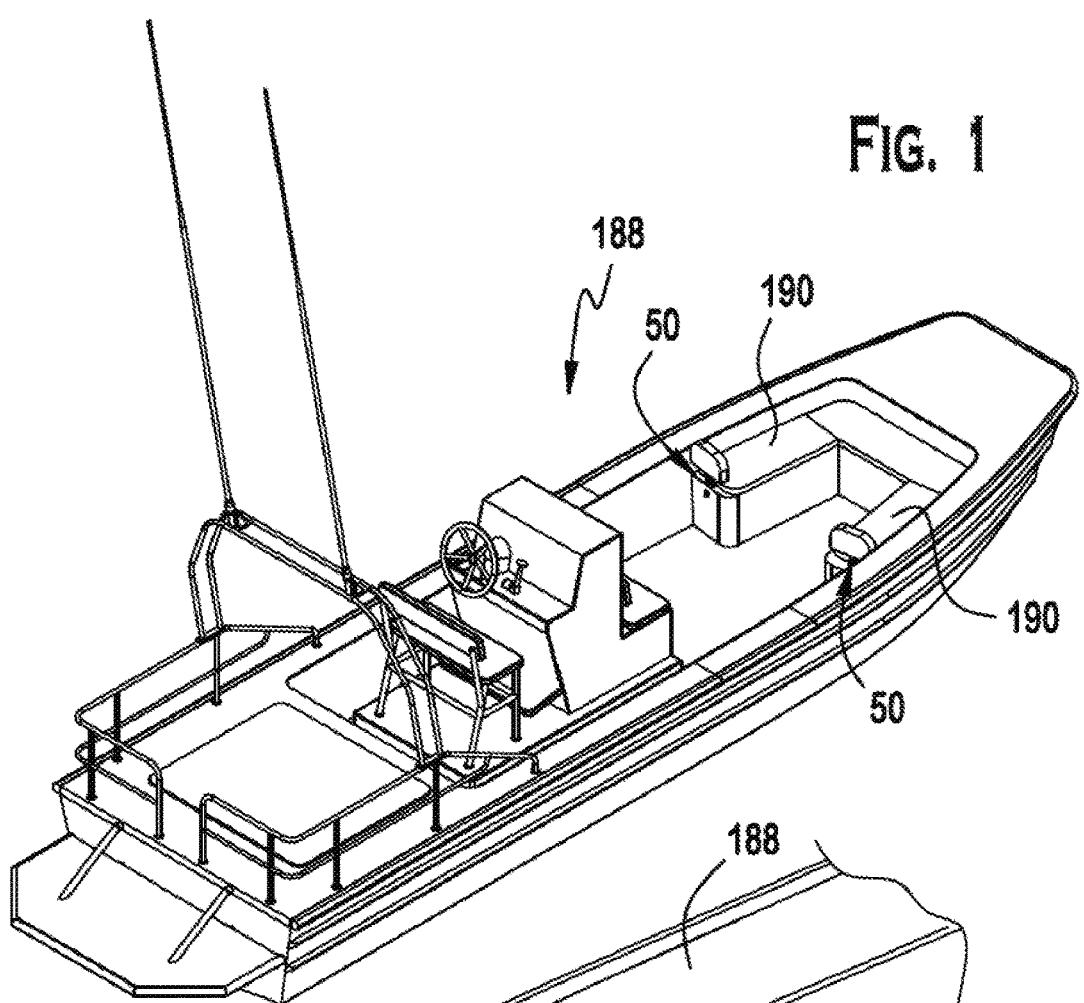
FIG. 1 is a perspective view of a boat 188 which includes boat chairs 190 which each incorporate a connector mechanism 50 according to a preferred embodiment of the present invention.

Certain terminology is used in the following description for convenience only and is not limiting. The words "up" and "down" designate directions in the drawings to which reference is made. Additionally, the words "a" and "one" are defined as including one or more of the referenced items unless specifically stated otherwise. The words "proximal", "distal", "rearward", "forward", "approximate" when used to identify position or direction or approximate length of an element generally refers to the point of view while observing the drawings. This terminology includes the words above specifically mentioned, derivatives thereof, and words of similar import.

Figure 2:
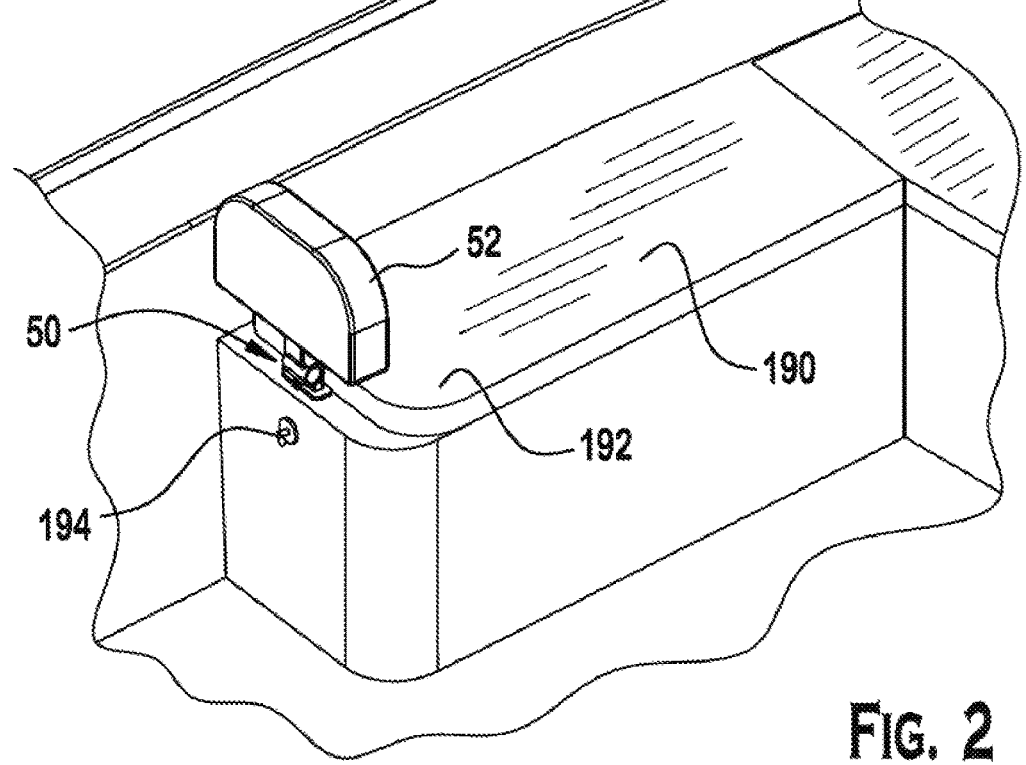
FIG. 2 is a broken away enlarged perspective view of the boat of FIG. 1 illustrating the back support structure 52 of the boat chair 190 which includes the connector mechanism 50. A post is used to connect the back support structure 52 to a seat support structure 192. The post may be detachably inserted into the seat support structure 192 and secured thereto via a pin 194 or other suitable quick connect mechanism.

Referring to FIGS. 1-44, the present invention is directed to multiple embodiments of a connector mechanism 50. The embodiments of the connector mechanism 50 shown in FIG. 34 are preferably formed by the following components: first and second connector subassemblies 240, 242, first and second biased pin assemblies 162, 164, a spacer rod 248, and/or a control bar 250. The connector mechanisms 50 may be retrofitted into pre-existing boat chairs 190 or integrated into boat chairs 190 during original manufacturing. The connector mechanisms 50 make it possible for a person to recline and lounge in a boat chair that may have previously only been suited for sitting upright. This tremendous innovation now makes it possible for a boat owner to maximize the ability to special purpose his or her watercraft to meet the changing needs of guests. Referring to FIGS. 1-32, one preferred embodiment of the connector mechanism 50 is used with a back support structure 52 of a boat chair 190. The back support structure 52 has at least one post 54 configured to connect to a seat 190 on a boat 188. Referring to FIGS. 1 and 2, a boat 188 may include boat chairs 190 which each incorporate the connector mechanism 50.

The connector mechanism 50 and its component parts are preferably made of a sturdy, high strength, corrosion resistant material, such as stainless steel, aluminum, or alloy. The snap fit caps are preferably formed of polymer or rubber. However, those of ordinary skill in the art will appreciate from this disclosure that any suitable materials can be used without departing from the scope of the present invention.

The boat chairs 190 are illustrated as being one portion of a generally U-shaped storage container positioned near the bow of the boat 188. The seat support structure 192 preferably, includes cushions positioned on top of sturdy material similar to that used to form the decking of the boat. It is preferred that the seat support structure 192 include compartments for storage of supplies and other materials therein. Those of ordinary skill in the art will appreciate from this disclosure that although one specific configuration for the seat support structure 192 of the boat chair 190 is disclosed, the connector mechanism 50 can be used with any boat chair regardless of whether it is integrated with decking, storage compartments, or of a standalone configuration without departing from the scope of the present invention.

Figure 3:
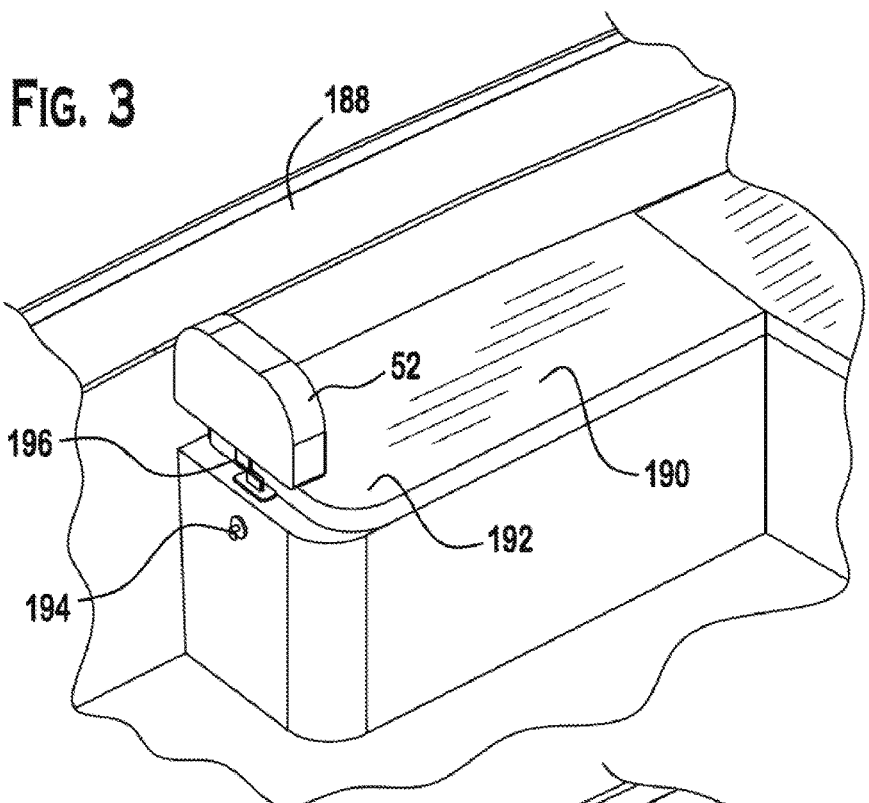
FIG. 3 is a broken away enlarged perspective view similar to that of FIG. 2 illustrating the back support structure 52 of a boat chair 190 which is connected via an inflexible post 196.

A post may be used to connect the back support structure 52 to the seat support structure 192. The post may be detachably inserted into the seat support structure 192 and secured thereto via a pin 194. Referring to FIG. 3, a back support structure 52 is shown with an inflexible post 196 that is secured to the seat support structure 192 of the boat chair 190. The inflexible post 196 may be secured to the boat chair via a pin 194 or via any other suitable mechanism.

Preferred implementations of preferred methods of the present invention will be described below (alone or in combination with various embodiments of the connector mechanism 50). The steps of the method of the present invention can be performed in any order, omitted, or combined without departing from the scope of the present invention. As such, optional or required steps described in conjunction with one implementation of the method can also be used with another implementation or omitted altogether. Additionally, unless otherwise stated, similar structure or functions described in conjunction with the below methods preferably, but not necessarily, operate in a generally similar manner to that described elsewhere in this application.

The structure and the operation of one preferred embodiment of the connector mechanism 50 will be described in conjunction with the following preferred method of retrofitting an existing boat chair 190 to include the connector mechanism 50. The back support structure 52 has a post (which includes a first post segment 56 and a second post segment 58) configured to connect to a seat 190 on a boat 188.

Figure 4:
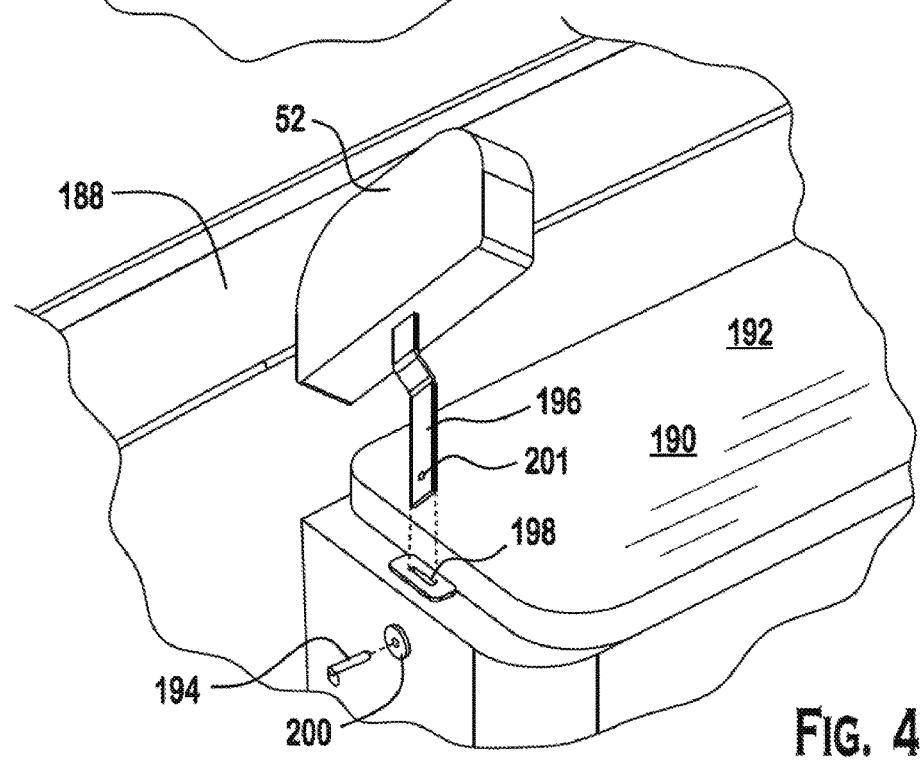
FIG. 4 is a broken away enlarged perspective view similar to that of FIG. 3 illustrating the back support structure 52 and the inflexible post 196 disengaged from a slot 198 in the seat support structure 192 of the boat chair 190. The pin 194 is withdrawn from a pin receptacle 200 such that post hole 201 is disengaged from the pin 194 to allow the inflexible post 196 to be separated from the seat support structure 192.

As shown in FIG. 4, the back support structure 52 and the inflexible post 196 may be disengaged from a slot 198 in the seat support structure 192 of the boat chair 190. The pin 194 is withdrawn from a pin receptacle 200 such that post hole 201 is disengaged from the pin 194 to allow the inflexible post 196 to be separated from the seat support structure 192.

Figure 5:
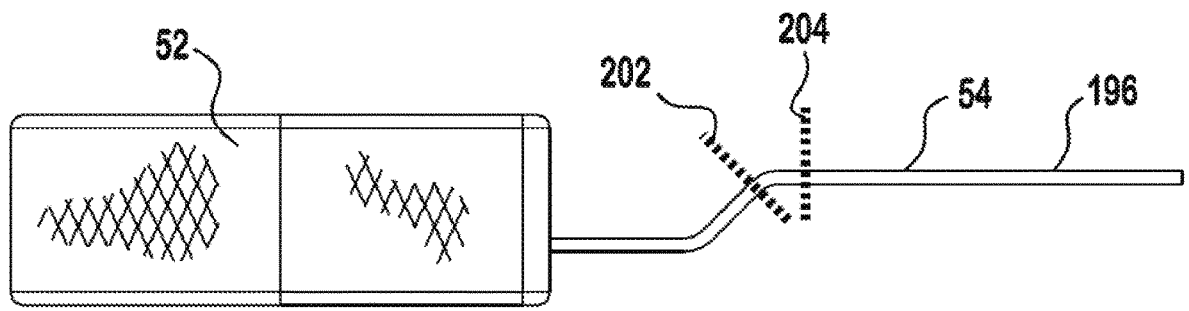
FIG. 5 is a side elevational view of the back support structure 52 and the inflexible post 196 showing a first step in one preferred method of the present invention of retrofitting the boat chair 192 to include the connector mechanism 50. The inflexible post 196 is preferably cut along first and second cut lines 202, 204.
Figure 6:
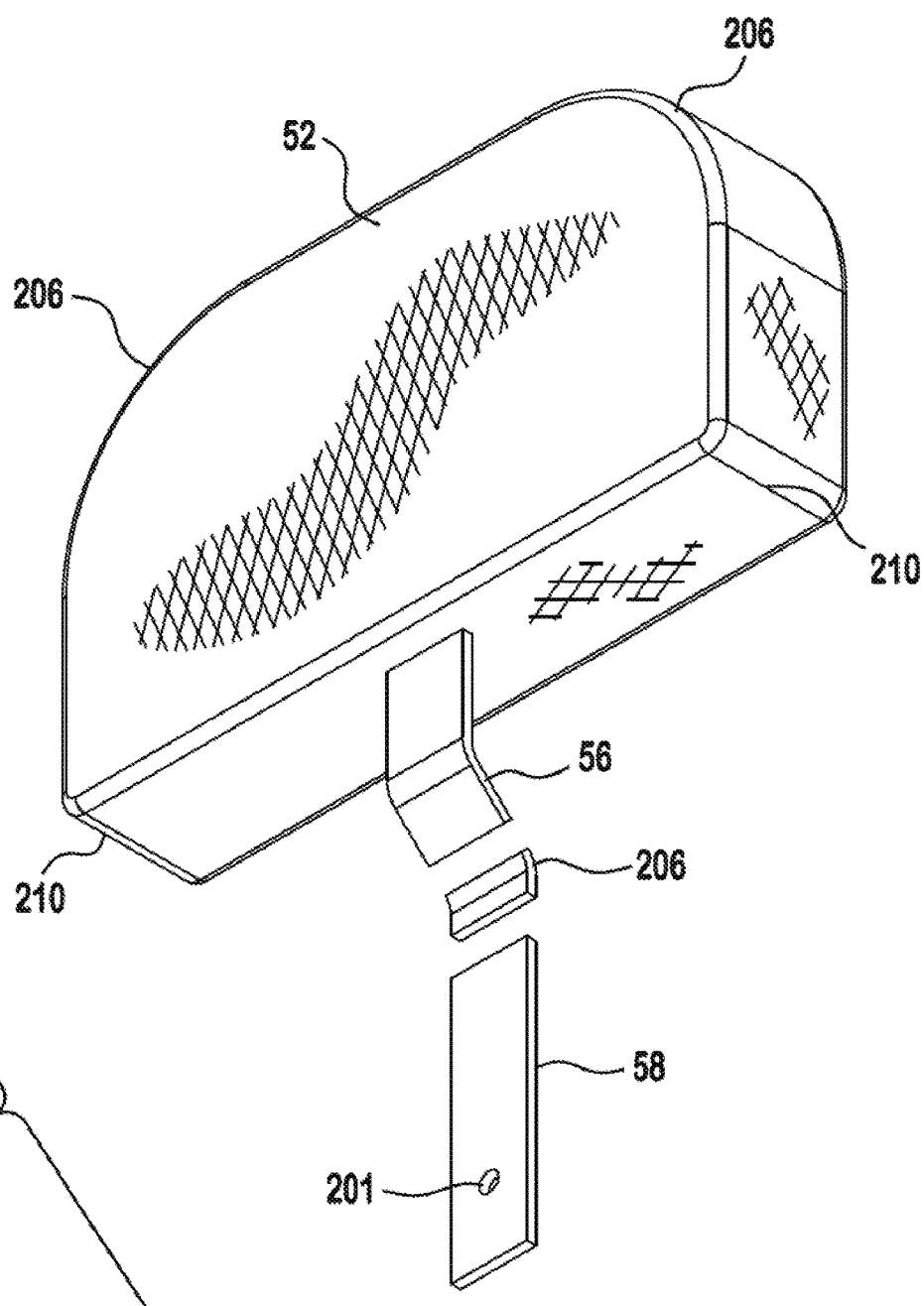
FIG. 6 is a perspective view of the back support structure 52 and inflexible post 196 of FIG. 5 illustrating a second step in the preferred method of retrofitting. After making at least one cut along at least one of the first and second cut lines 202, 204 the inflexible post 196 is divided into at least two pieces: a first post segment 56, a second post segment 58, and (possibly, but not necessarily) a section of the original post 206 which can be discarded. The back support structure 52 preferably has a curvilinear profile 208 on the upper left and upper right corners. It is also preferred that the back support structure 52 include rounded corners 210 on the lower left and lower right edges thereof.

Referring now to FIGS. 5 and 6, the inflexible post 196 is preferably cut along at least one of first and second cut lines 202, 204. After cutting the inflexible post 196 into at least two segments: a first post segment 56, a second post segment 58, and (preferably, but not necessarily) a discard section 206 of the original post 206 which can be recycled or otherwise disposed of. The back support structure 52 preferably has a curvilinear profile 208 on the upper left and upper right corners. It is also preferred that the back support structure 52 include rounded corners 210 on the lower left and lower right edges thereof. Those of ordinary skill in the art will appreciate from this disclosure that a single cutline 202 (or any number) may be used without departing from the scope of the present invention. Additionally, those of ordinary skill in the art will appreciate from this disclosure that the specific configuration of the back support structure 52 can be varied in structure, shape, texture, etc. without departing from the scope of the present invention.

Figure 13:
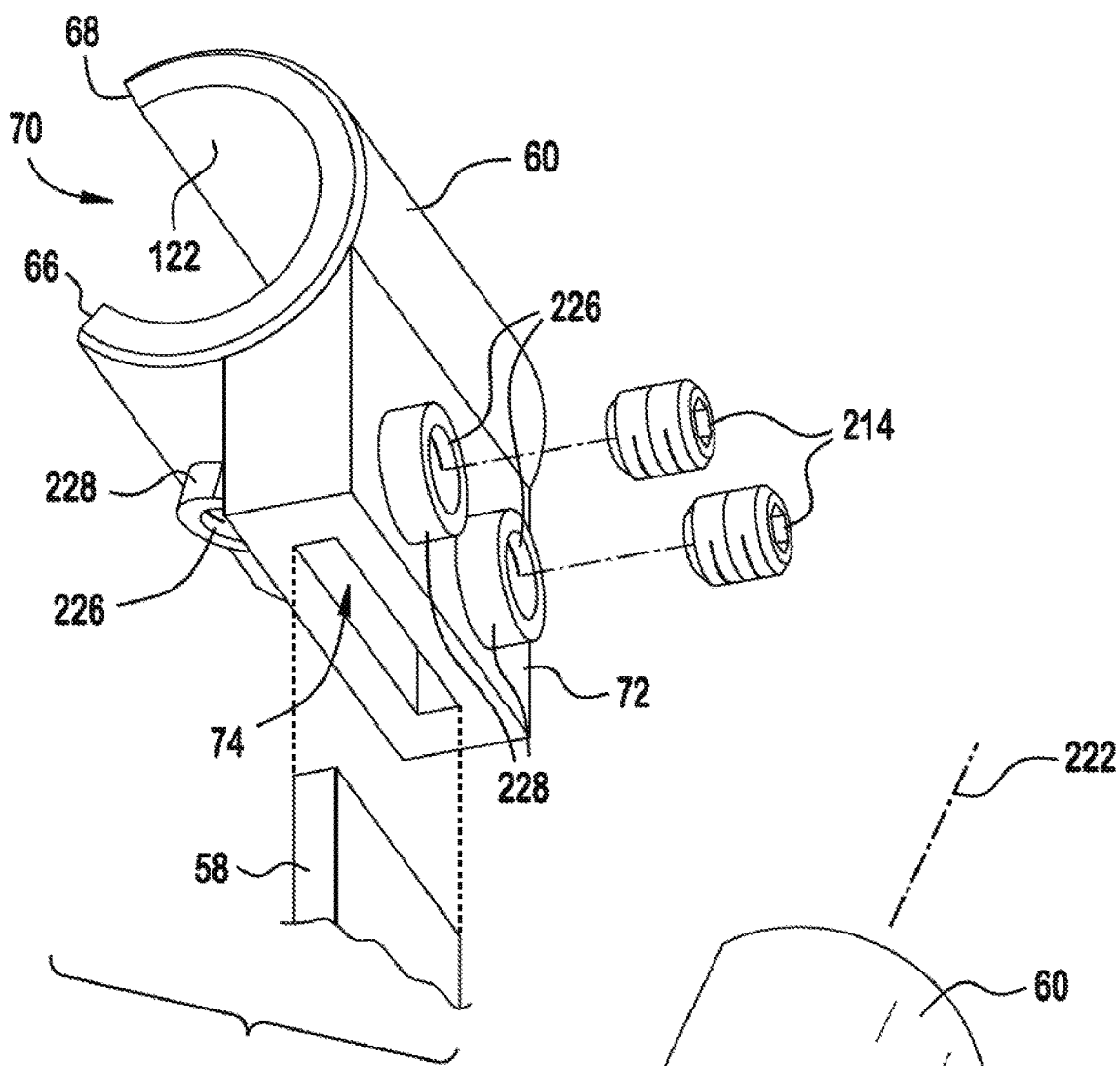
FIG. 13 is a bottom perspective view of a sleeve 60 which preferably forms part of the connector mechanism 50 of the present invention.
Figure 14:
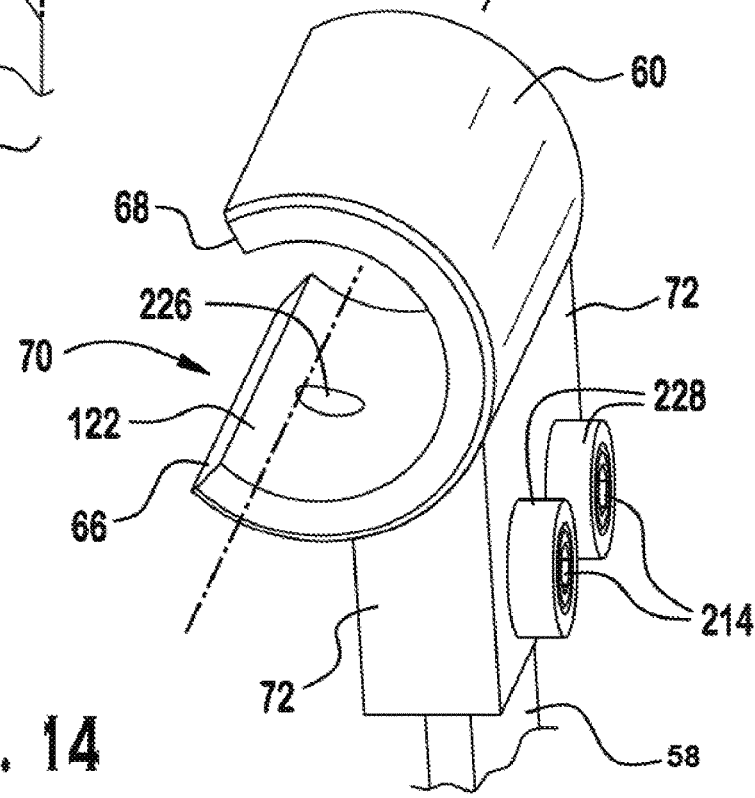
FIG. 14 illustrates a top plan view of the sleeve 60 which is preferred for use in forming the preferred connector mechanism 50 of the present invention. The second post segment 58 is fully inserted into the mounting housing 72 and secured therein via set screws 214.

As shown in FIGS. 13 and 14, a sleeve 60 preferably encloses a central axis 224. The sleeve 60 is preferably configured to engage the second post segment 58. The sleeve 60 preferably includes a mounting housing 72. The mounting housing 72 may be generally rectilinear or have any other shape without departing from the scope of the present invention. The mounting housing 72 preferably extends generally downwardly and defines a mounting slot 74 which is configured to receive an end of the second post segment 58 therein. The second post segment 58 is preferably detachably secured within the mounting slot 74 of the mounting housing 72 via set screws 214 that are inserted into fastener holes 226. The fastener holes 226 may include bossing 228 therearound which may form an annular ring/collar shape. Those of ordinary skill in the art will appreciate from this disclosure that the second post segment 58 can be permanently affixed to the sleeve 60 (via welding, casting, or the like) without departing from the scope of the present invention. While one method of detachably securing the second post s g rent 58 to the sleeve 60 has been disclosed, those of ordinary skill in the art will appreciate from this disclosure that any suitable method of detachably and/or non-detachably securing the second post segment 58 to the sleeve 60 can be used without departing from the scope of the present invention.

Referring to FIG. 7 an indexing core 62 is rotatably positionable within the sleeve 62 for rotation about the central axis 224. The indexing core 62 is preferably configured to engage the first post segment 56. The first post segment 56 may be aligned for insertion into a core bore 222 in the indexing core 62. The first post segment 56 preferably has a generally rectilinear cross-section. However, those of ordinary skill in the art will appreciate that the first post segment 56 (as well as first and second post segments 130, 136, described below) may have any other cross-section (such as circular, irregular, hexagonal or the like) without departing from the scope of the present invention.

A free end 212 of the first post segment 56 is inserted into the core bore 222 and is preferably detachably secured therein by set screws 214 which contact a bearing surface 216 of the first post segment 56. The first post segment 56 preferably includes a bend 218 such that the first post segment extends through an angle 220.

Figure 19:
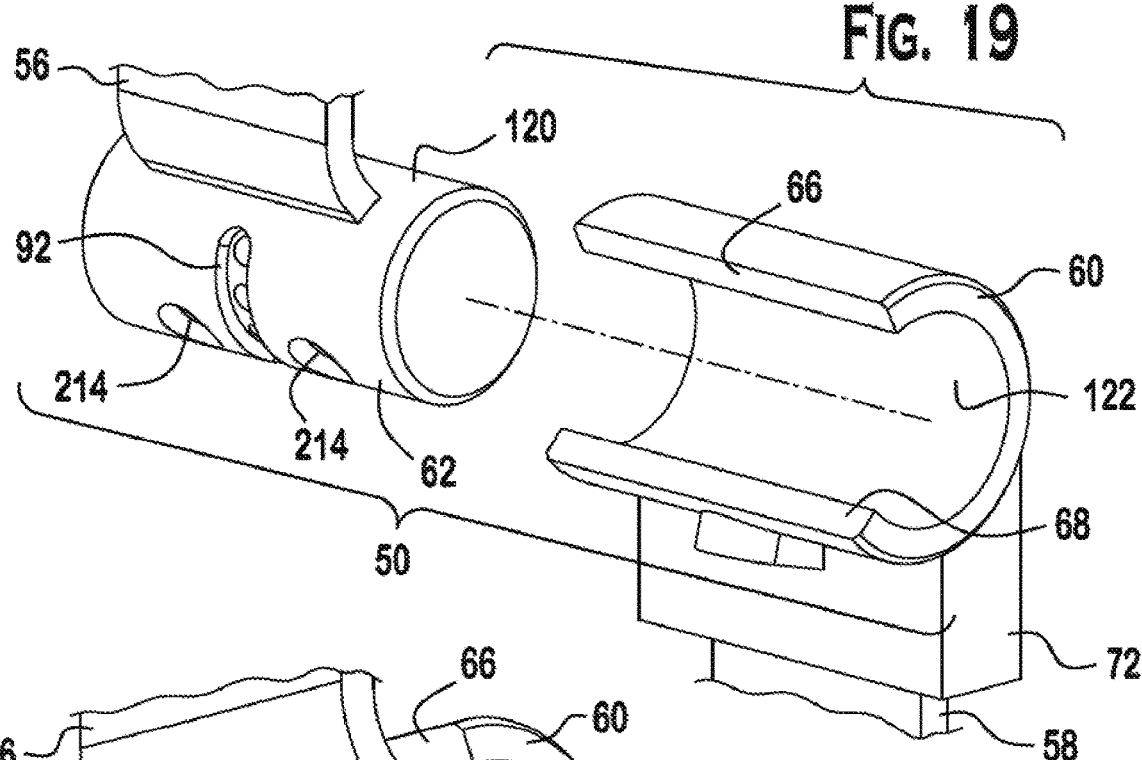
FIG. 19 is a partial exploded view of the connector mechanism 50 according to preferred embodiment of the present invention. In the fifth preferred step of the method of retrofitting a boat chair to include the connector mechanism 50 the indexing core 62 and the sleeve 60 are preferably commonly aligned about the central axis 224 and the indexing core 62 is axially, displaced along the central axis 224 so that the indexing core 26 is positioned within the sleeve 60. The indexing core 62 is preferably rotatably located within the sleeve for rotation about the central axis 224.
Figure 20:
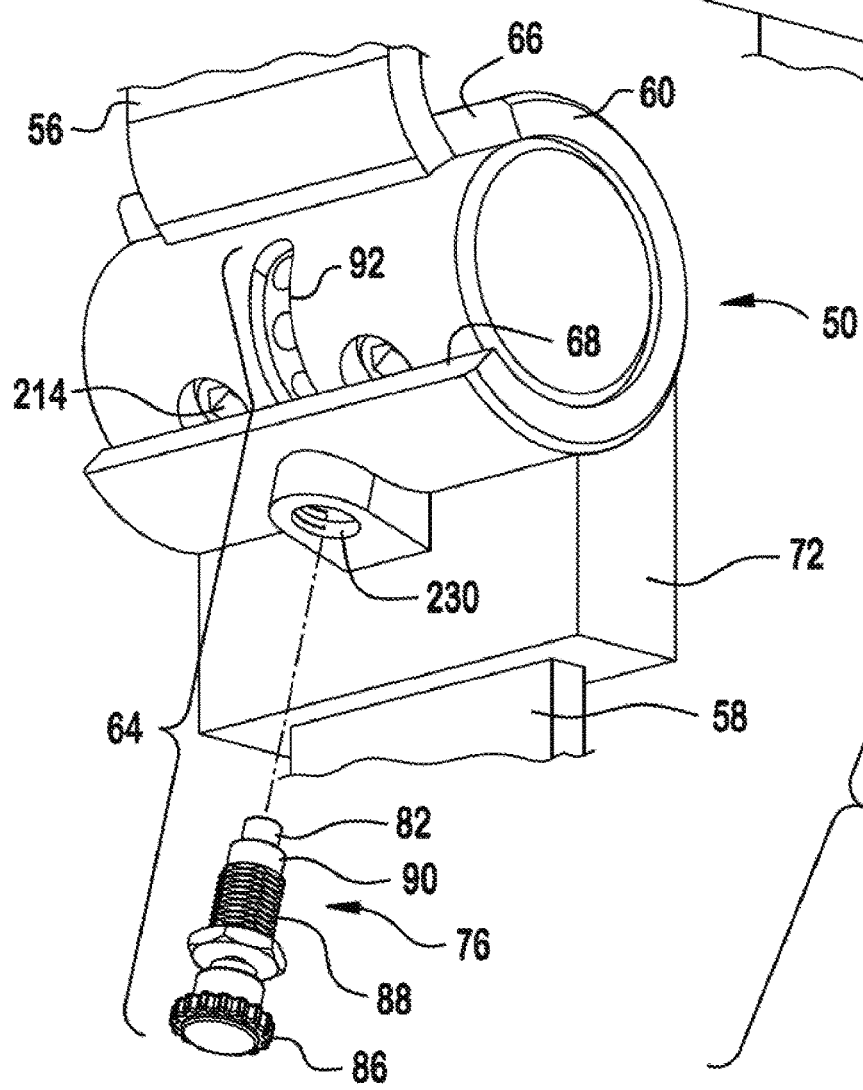
FIG. 20 is a bottom perspective view of the connector mechanism 50 according to preferred embodiment of the present invention illustrating a locking mechanism 64 which is preferably configured to detachably secure the position of the indexing core 62 relative to the sleeve 60 such that an angle between the first post segment and the second post segment can be secured in one of a plurality of positions. The locking mechanism 64 preferably, but not necessarily, includes the biased pin assembly 76, the assembly bore 230, the core slot 92, and/or a plurality of pinholes 94, 96, 98, 100 in the indexing core 62. The biased pin assembly 76 preferably, includes a threaded portion 88, a boss portion 90, and a pin 82.
Figure 23:
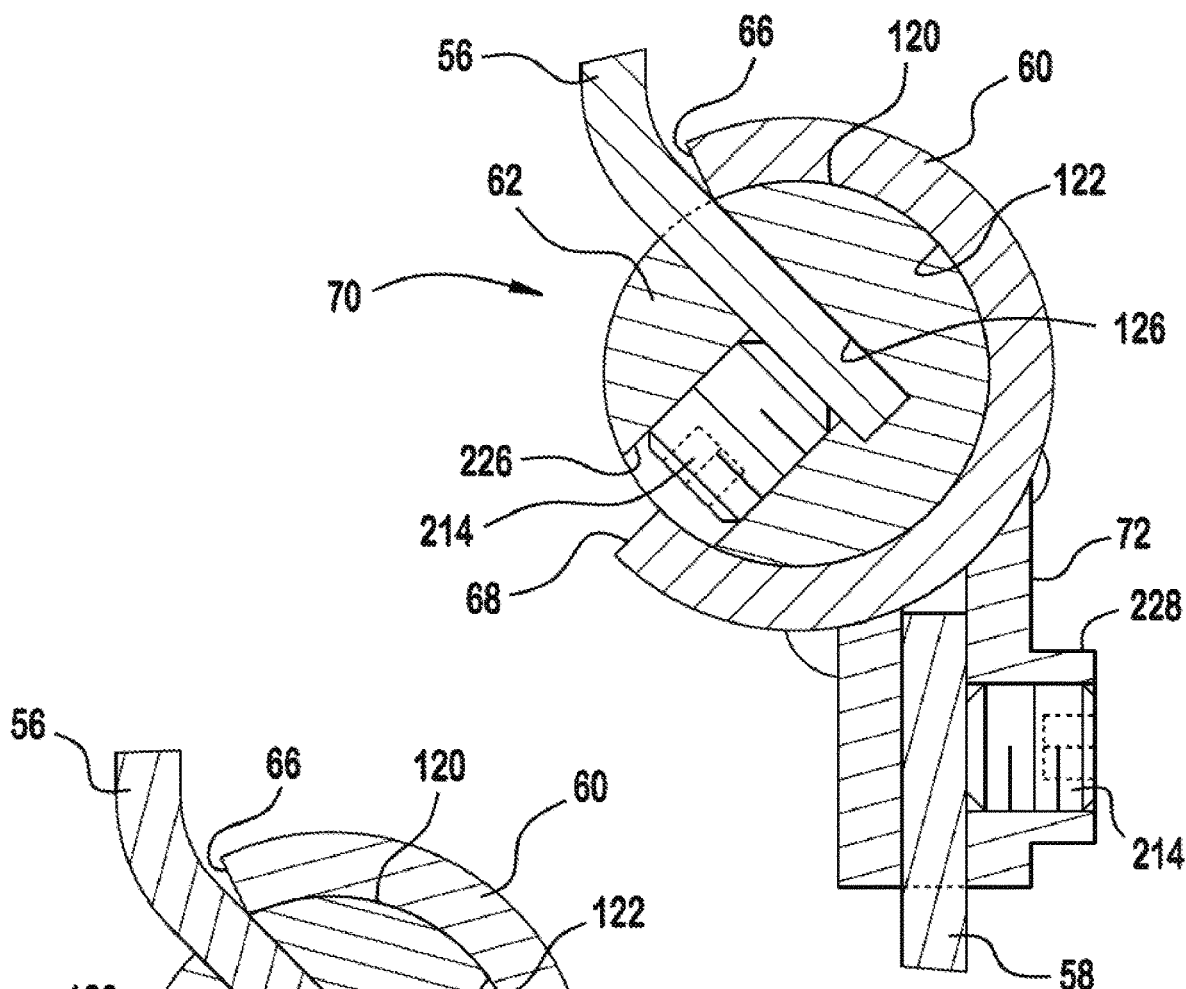
FIG. 23 is a cross-sectional view of the connector mechanism of FIG. 22 as taken along the lines 23-23 in FIG. 22 according to a preferred embodiment of the present invention. A set screw 214 is located in the fastener hole 226 and secures the first post segment 56 within the indexing core 62. Another set screw 214 is inserted in a faster hole in the mounting housing 72 to secure the second post segment 58 therein. The indexing core 62 is rotated such that the first post segment 56 is in contact or very close to first sleeve wall 66 which results in the back support structure 52 being maintained in the most upright position.
Figure 24:
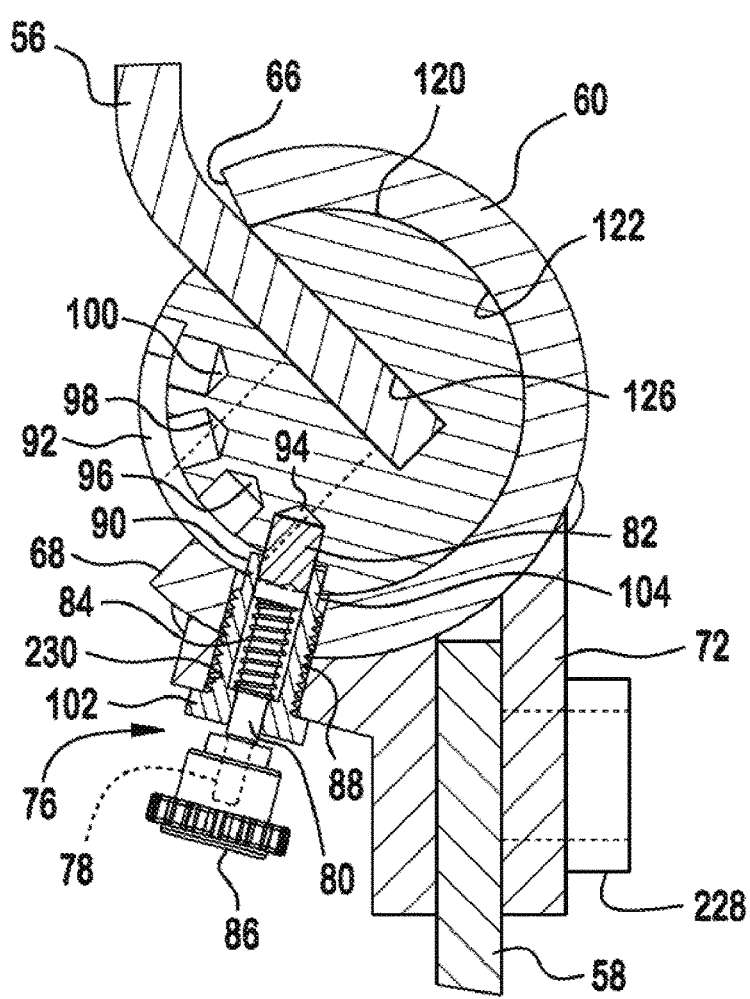
FIG. 24 is a cross-sectional view of the connector mechanism of FIG. 22 as taken along the lines 24-24 in FIG. 22 according to a preferred embodiment of the present invention. The biased pin assembly 76 preferably includes a barrel 102 that is preferably cylindrical in shape. The barrel can include a threaded portion 88 and a boss portion 90. A knob 86 is preferably attached to a first rod 78 which is attached to a second rod 80. The second rod 80 includes a pin 82 located opposite the knob 86. Those of ordinary skill in the art will appreciate from this disclosure that a single rod can be used without departing from the scope of the present invention. A biasing member 84, such as a spring or the like, is positioned over a portion of the second rod 80 and is configured to bias the pin 82 radially inwardly into the indexing core 62. The threaded portion 88 of the barrel 102 is threaded into the assembly bore 230. It is preferred that when the threaded portion 88 is properly inserted into the assembly bore 230 that at least a portion of the boss portion 90 protrudes from the sleeve 60 and extends into the core slot 92 of the indexing core 62. This prevents the indexing core 62 from sliding axially along the central axis 224 and axially misaligning the indexing core 62 with the sleeve 60 when the knob 86 of the biased pin assembly 76 is pulled radially outwardly.
Figures 25, 26:
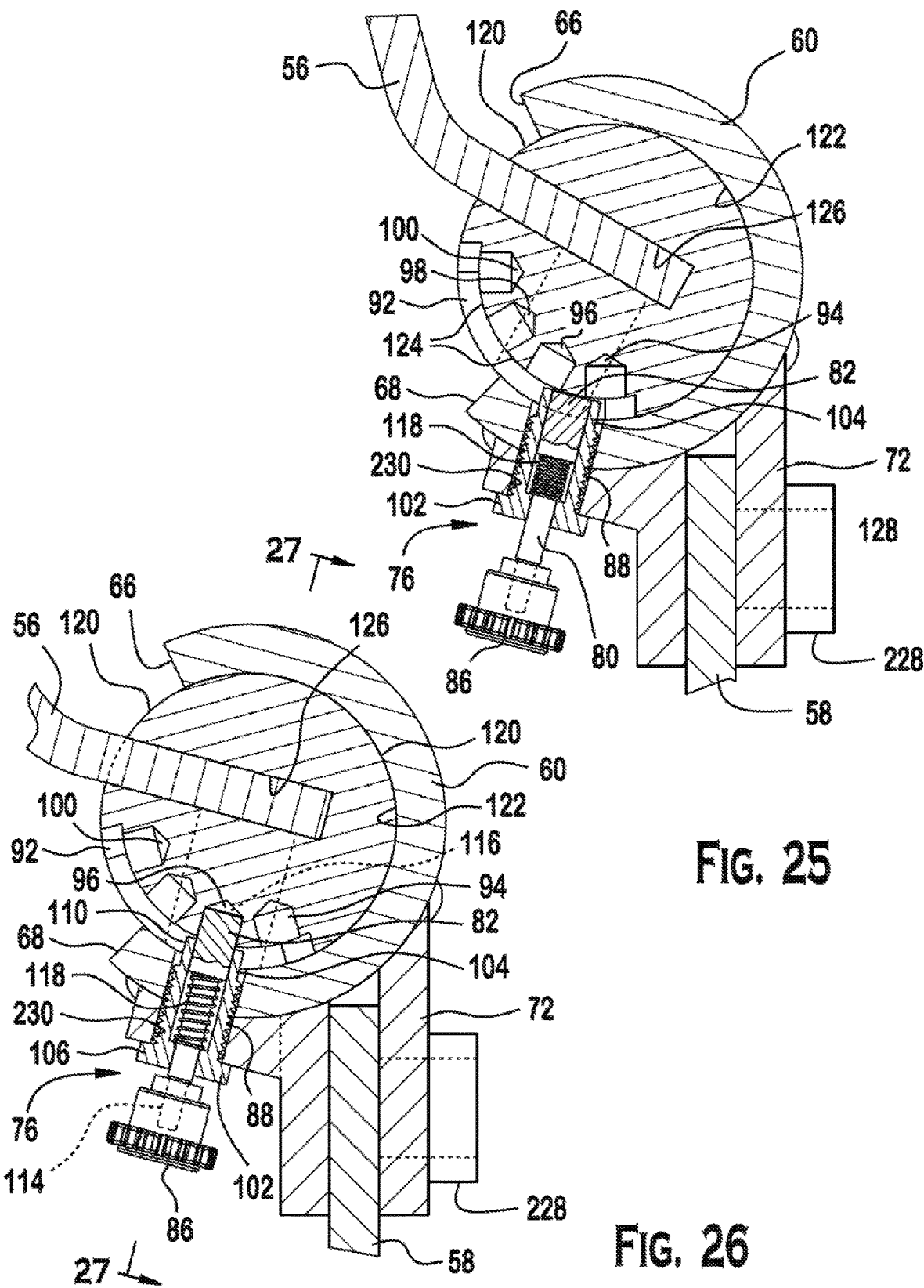
FIG. 25 is a cross-sectional view of a preferred embodiment of the connector mechanism 50 similar to that shown in FIG. 24, Here, the knob 86 of the biased pin assembly 76 has been moved radially outwardly to disengage the pin 82 from first pin hole 94 and the first post segment 56 rotated counterclockwise bringing the biased pin assembly 76 into alignment with the base surface 124 of the core slot 92.
FIG. 26 is a cross-sectional view of the preferred embodiment of the connector mechanism 50 similar to that of FIG. 25. The first post segment 56 was further rotated counterclockwise relative to that shown in FIG. 25 until the pin 82 was in alignment with the second pin hole 96. Then the knob 86 was released and the biasing member 118 drove the pin 82 into engagement with the second pin hole 96. Thus

As shown in FIGS. 23, 25, and 26, the sleeve 60, when viewed in cross section perpendicular to the central axis 224, preferably has first and second sleeve walls 66, 68 defining a circumferential sleeve gap 70. Referring specifically to FIGS. 23 and 24, the connector mechanism 50 is preferably configured for the first post segment 56 to be engaged with the indexing core 62 and to extend through the circumferential sleeve gap 70. Referring to FIGS. 19 and 20, it is preferred, but not necessary, that a mounting housing 72 is disposed on the sleeve 60 and configured to engage the second post segment 58. Those of ordinary skill in the art will appreciate from this disclosure that the mounting housing 72 may be omitted and the second post segment directly connected to the sleeve (detachably or permanently) without departing from the scope of the present invention.

Figure 9:
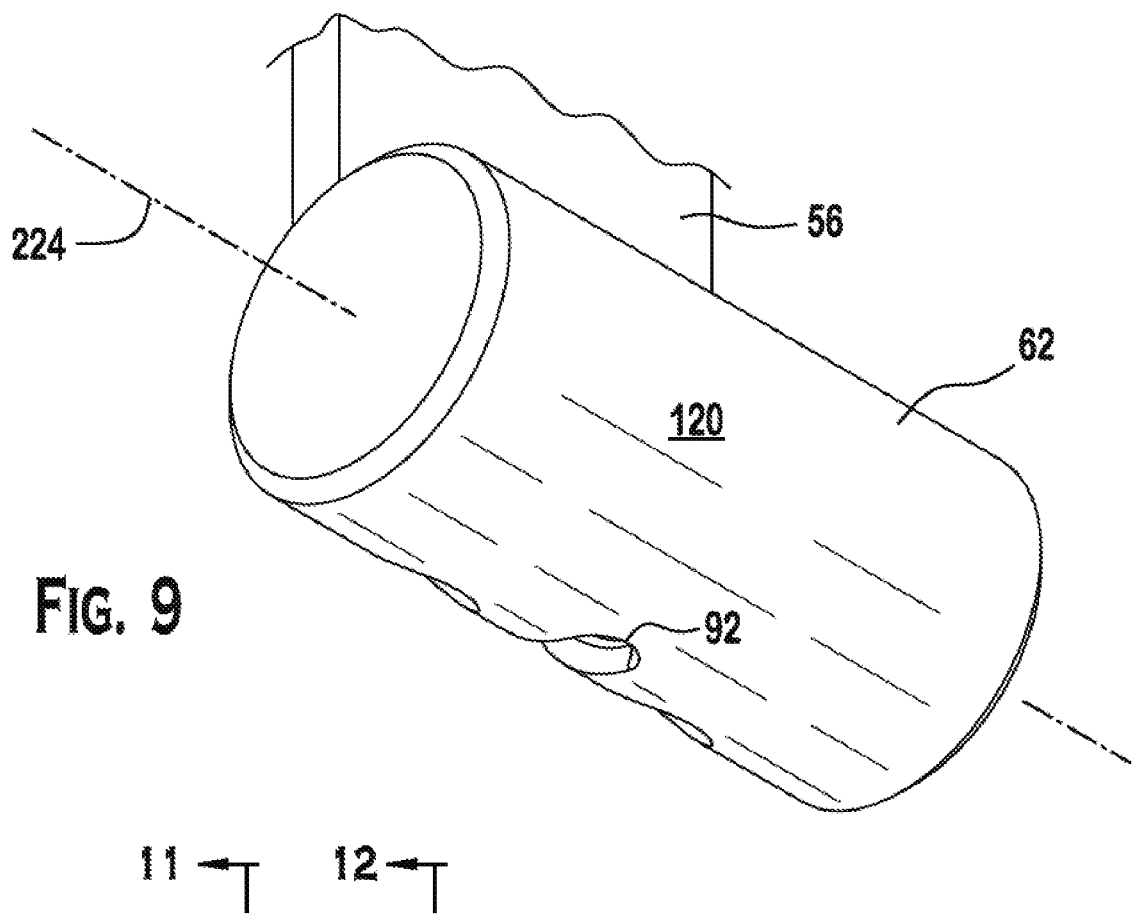
FIG. 9 is a bottom perspective view of the indexing core 62 of the present invention with the first post segment 56 attached thereto. A central axis 224 of the connector mechanism 50 is illustrated.
Figure 10:
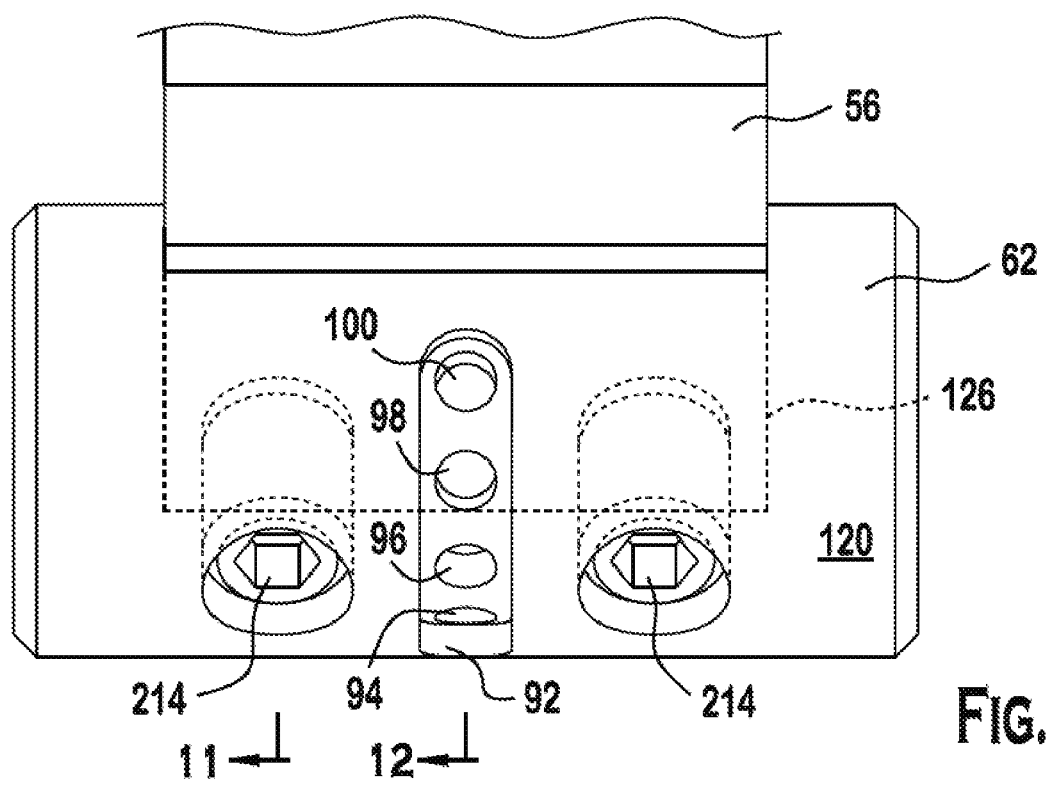
FIG. 10 is a rear side elevational view of the indexing core 62 of the present invention illustrating the first post segment 56 inserted into the core bore 222 and secured therein via set screws 214.

Referring to FIGS. 8 and 9, the first post segment 56 is preferably detachably secured within the indexing core 62. After being inserted into the core bore 222 the first post segment 56 is preferably detachably secured therein via set screws 214. Referring again to FIGS. 25 and 26, it is preferred that the sleeve 60 has an inner sleeve surface 122. The indexing core 62 preferably has an outer core surface 120. It is preferred that the inner sleeve surface 122 overlies and is in direct sliding contact with the outer sleeve surface 120 of the indexing core 62. Those of ordinary skill in the art will appreciate that rolling elements and/or a bearing can be interposed between the sleeve 60 and the indexing core 62 without departing from the scope of the present invention.

It is preferred that the outer core surface 0 of the indexing core 62 defines a core slot 92 therein. The core slot 92 may extend generally circumferentially along the outer core surface 120 when the indexing core 62 is viewed in cross section as taken along a direction perpendicular to the central axis 224. The core slot 92 preferably extends through a predetermined arc, such as ninety degrees (90°) or further.

Figure 12:
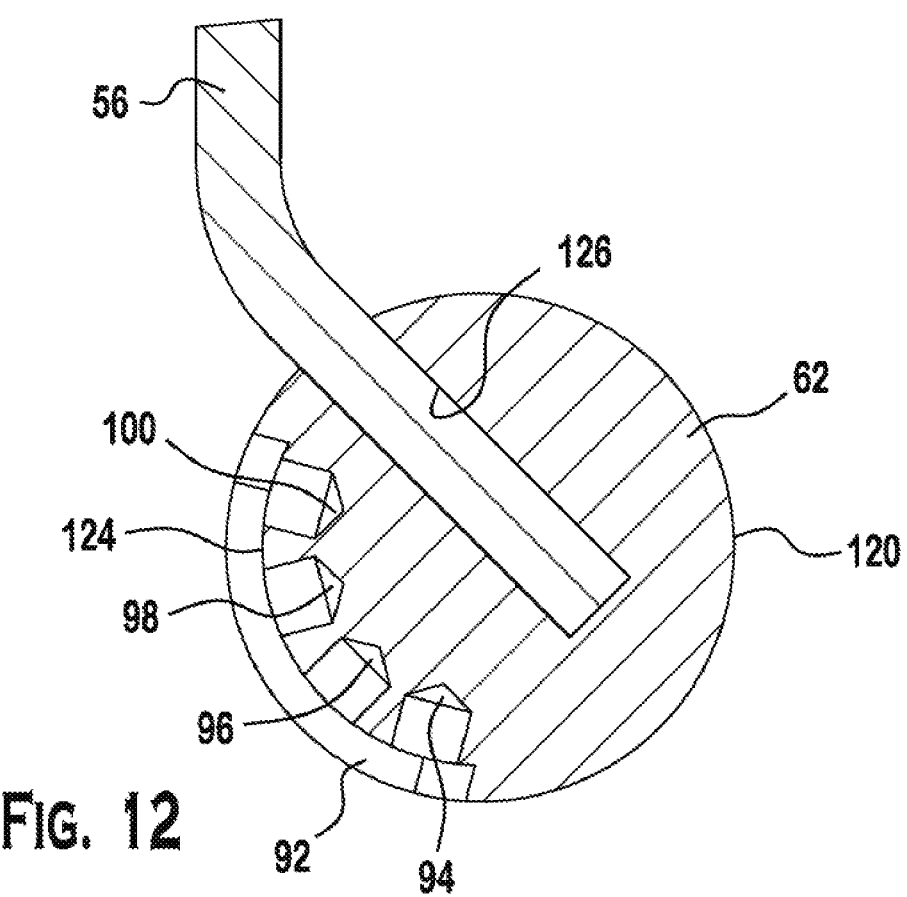
FIG. 12 is a cross-sectional view of the indexing core 62 as taken along the lines 12-12 of FIG. 10 and illustrates a profile of the core slot 92 and of the plurality of pinholes 94, 96, 98, 100. Those of ordinary skill in the art will appreciate from this disclosure that any number of pinholes may be used without departing from the scope of the present invention. The pinholes 94, 96, 98, 100 preferably extend radially inwardly from a base surface 124 of the core slot 92.

It is desirable that the core slot 92 is sufficient in length to allow the back support structure to be fully reclined horizontally to facilitate lounging. This allows boaters to make a chair multi-purpose, such as both for sitting and lounging in a reclined position. Now it is possible for a single boat to both maximize space for various activities. If fishing, the back support structure can be raised to a vertical position to provide the maximum amount of room to boaters walking around the deck during fishing. Alternatively, when sunbathing is preferred the seat support structure can be reclined to allow a boater to lay out in the sun. As shown in FIG. 12, it is further preferred that the core slot 92 include a plurality of pinholes 94, 96, 98, 100 along the base surface 124 of the core slot 92. Those of ordinary skill in the art will appreciate from this disclosure that any number of pinholes may be used without departing from the scope of the present invention. The pinholes 94, 96, 98, 100 preferably extend radially inwardly from, a base surface 124 of the core slot 92.

Referring again to FIG. 7, the outer core surface 120 of the indexing core 62 may define the core bore 222 therein. The core bore 222 may be configured to sliding the receive the first post segment 56.

As shown in FIG. 13, the mounting housing 72 preferably defines a housing bore 74 configured to sliding receive the second post segment 58. A fourth step in a method of retrofitting a boat chair 190 preferably includes the sleeve 60 receiving the second post segment 58. The sleeve 60 preferably includes a mounting housing 72. The mounting housing 72 may be generally rectilinear or have any other shape without departing from the scope of the present invention. The mounting housing 72 preferably includes a mounting slot 74 which is configured to receive an end of the second post segment 58 therein. Alternatively, the second post segment can be permanently attached to the sleeve 60 without departing from the scope of the present invention. The second post segment 58 is preferably detachably secured within the mounting slot 74 of the mounting housing 72 via set screws 214 that are inserted into fastener holes 226. The fastener holes 226 may include bossing 228 therearound which may form an annular ring/collar shape. Those of ordinary skill in the art will appreciate from this disclosure that the second post segment 58 can be detachably affixed to the sleeve 60 using any mechanism, such as rivets, snap fits, etc., without departing from the scope of the present invention.

Figure 15:
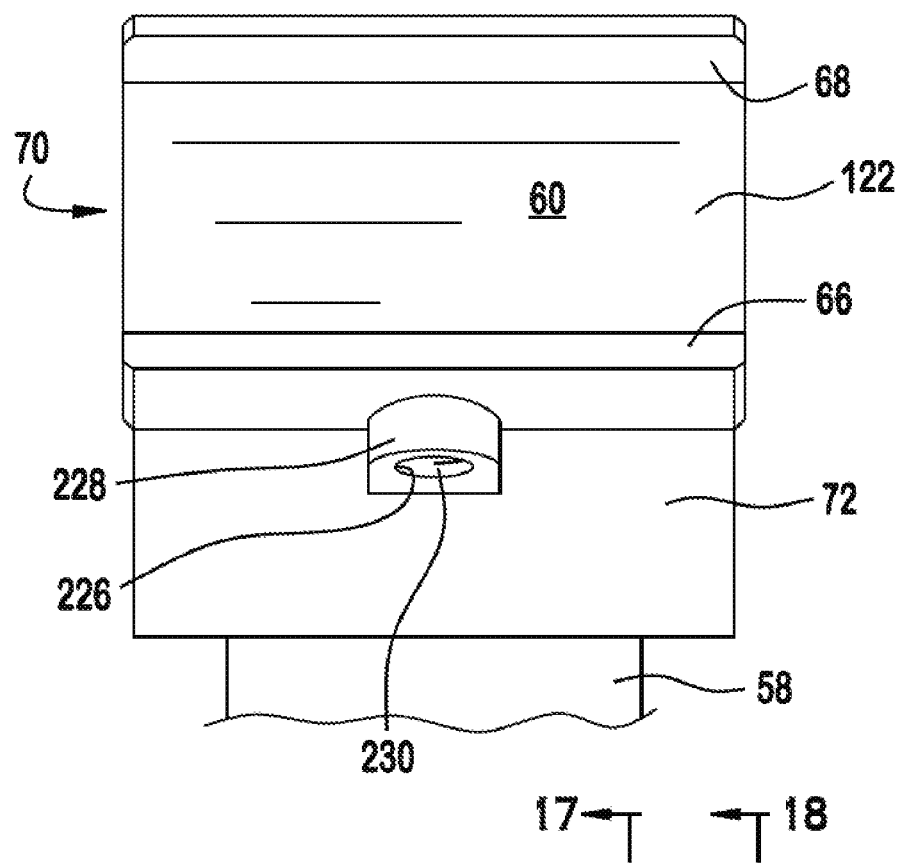
FIG. 15 is a rear elevational view of the sleeve 60 according to a preferred embodiment of the connector mechanism 50 of the present invention. A fastener hole 226 is shown in the sleeve 60 which is configured to receive a biased pin assembly 76 (shown in FIGS. 25 and 26). The faster hole 226 may include bossing 228 therearound.

Referring to FIGS. 14 and 15, the second post segment 58 is preferably fully inserted into the mounting housing 72 and secured therein via set screws 214. A fastener hole 226 is shown in the sleeve 60 which may be configured to receive the biased pin assembly 76 (shown in FIGS. 25 and 26). The fastener hole 226 may include bossing 228 therearound.

Figure 16:
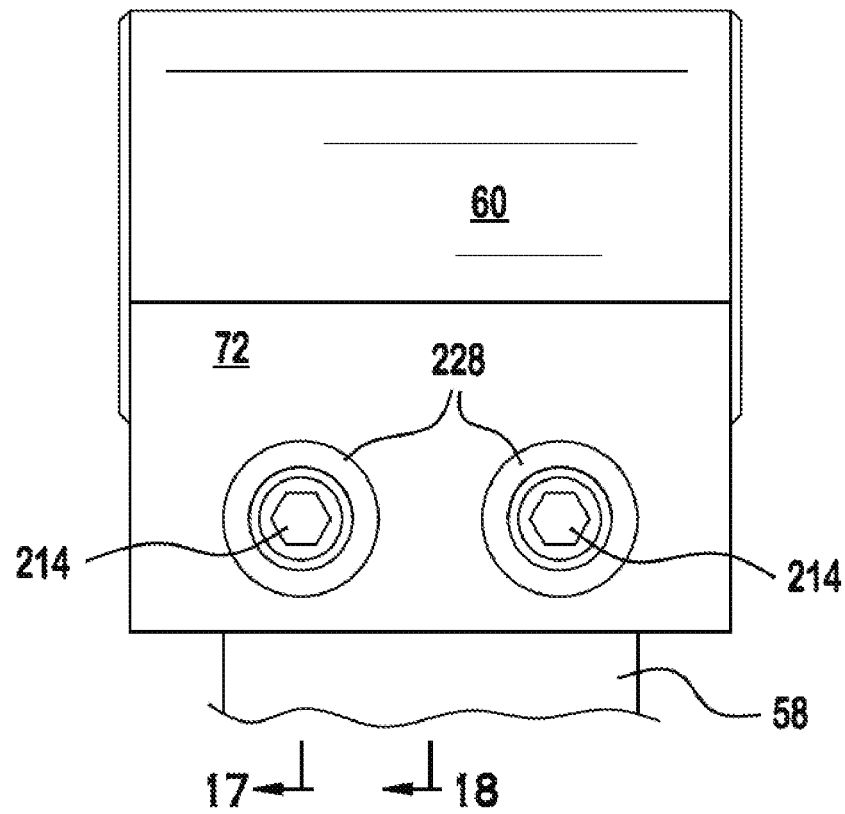
FIG. 16 is a front side elevational view of the sleeve 60 according to a preferred embodiment of the connector mechanism 50 of the present invention. One end of the second post segment 58 is preferably inserted in the mounting housing 70 and secured therein via set screws 214.
Figure 17:
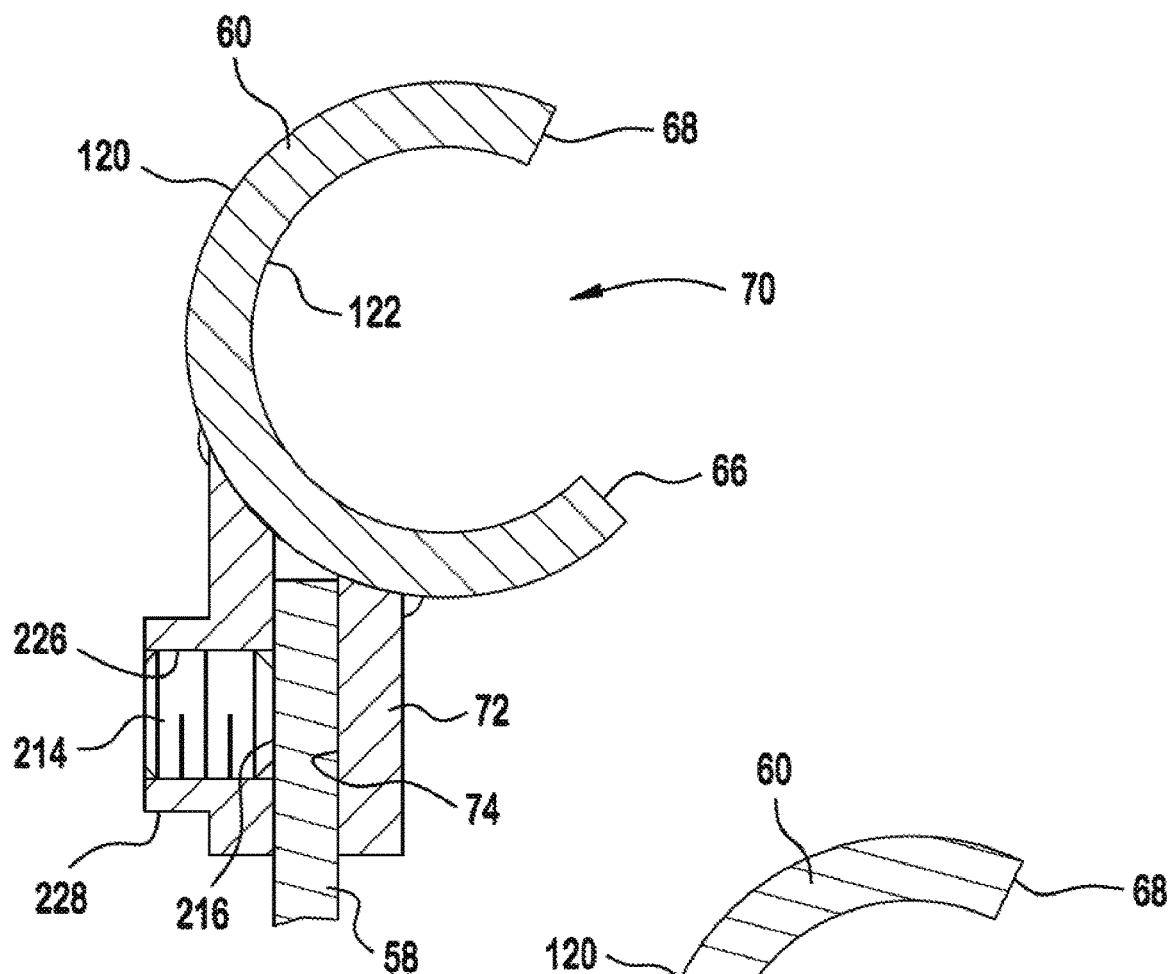
FIG. 17 is a cross-sectional view of the sleeve 60 of FIG. 16 as taken along the lines 17-17 in FIG. 16 according to a preferred embodiment of the present invention. The second post segment 58 is preferably detachably secured within the mounting slot 74 via set screws 214 which create a compression force against beating surface to 16 of the second post segment 58 to secure the second post segment 58 therein.

As shown in Referring to FIGS. 16 and 17, one end of the second post segment 58 is preferably inserted in the mounting housing 70 and secured therein via set screws 214. The second post segment 58 is preferably detachably secured within the mounting slot 74 via the set screws 214 which create a compression force against bearing surface 216 of the second post segment 58 to secure the second post segment 58 therein.

Figure 18:
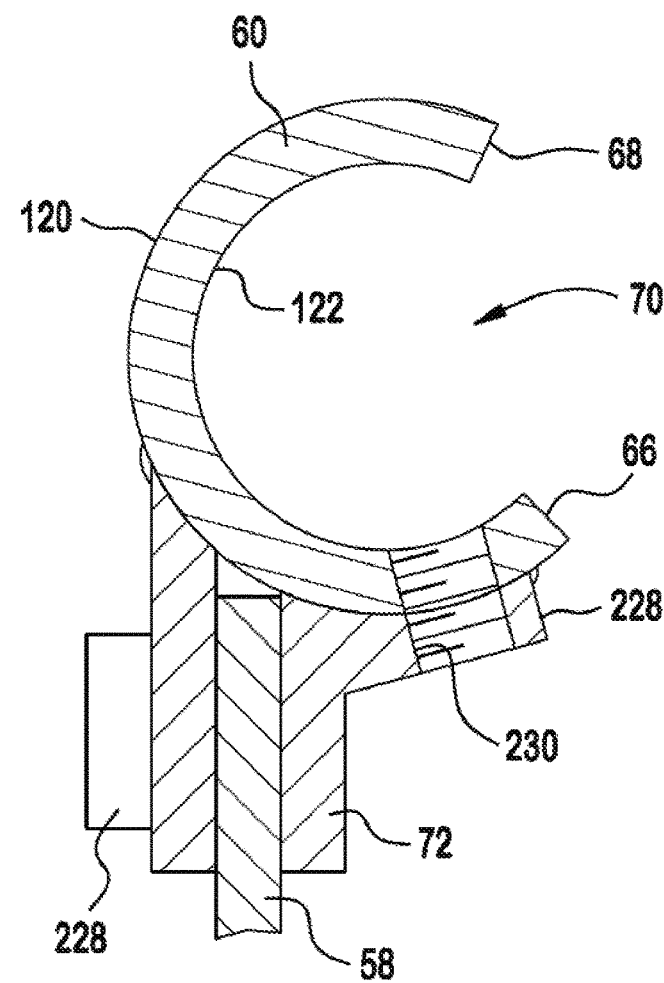
FIG. 18 is a cross-sectional view of the sleeve 60 of FIG. 16 as taken along the lines 18-18 in FIG. 16 according to a preferred embodiment of the present invention. The cross-section is taken through assembly bore 230 which is configured to receive the biased pin assembly 76 (shown in FIGS. 25 and 26) therein.

Referring now to FIGS. 18 and 19, in one method of retrofitting a boat chair to include the connector mechanism 50, the indexing core 62 and the sleeve 60 are preferably, commonly aligned about central axis 224 and the indexing core 62 is axially displaced along the central axis 224 so that the indexing core 26 is positioned within the sleeve 60. The indexing core 62 is preferably rotatably located within the sleeve for rotation about the central axis 224.

Figure 11:
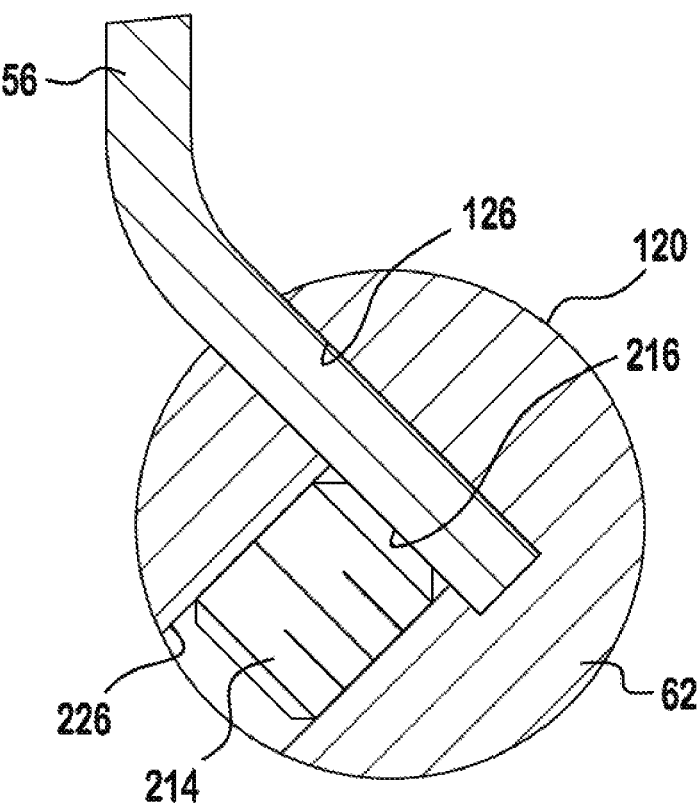
FIG. 11 is a cross-sectional view of the indexing core 62 as taken along the lines 11-11 in FIG. 10 which illustrates the first post segment 56 fully inserted into core bore 222 and detachably secured therein via a set screw 214. The set screw 214 is shown inserted into a fastener hole 226 and contacting the bearing surface 216 of the first post segment 56.

Referring to FIG. 11, the first post segment 56 can preferably be fully inserted into core bore 222 and detachably secured therein via a set screw 214. The set screw 214 is shown inserted into a fastener hole 226 and contacting the bearing surface to 16 of the first post segment 56.

Figure 29:
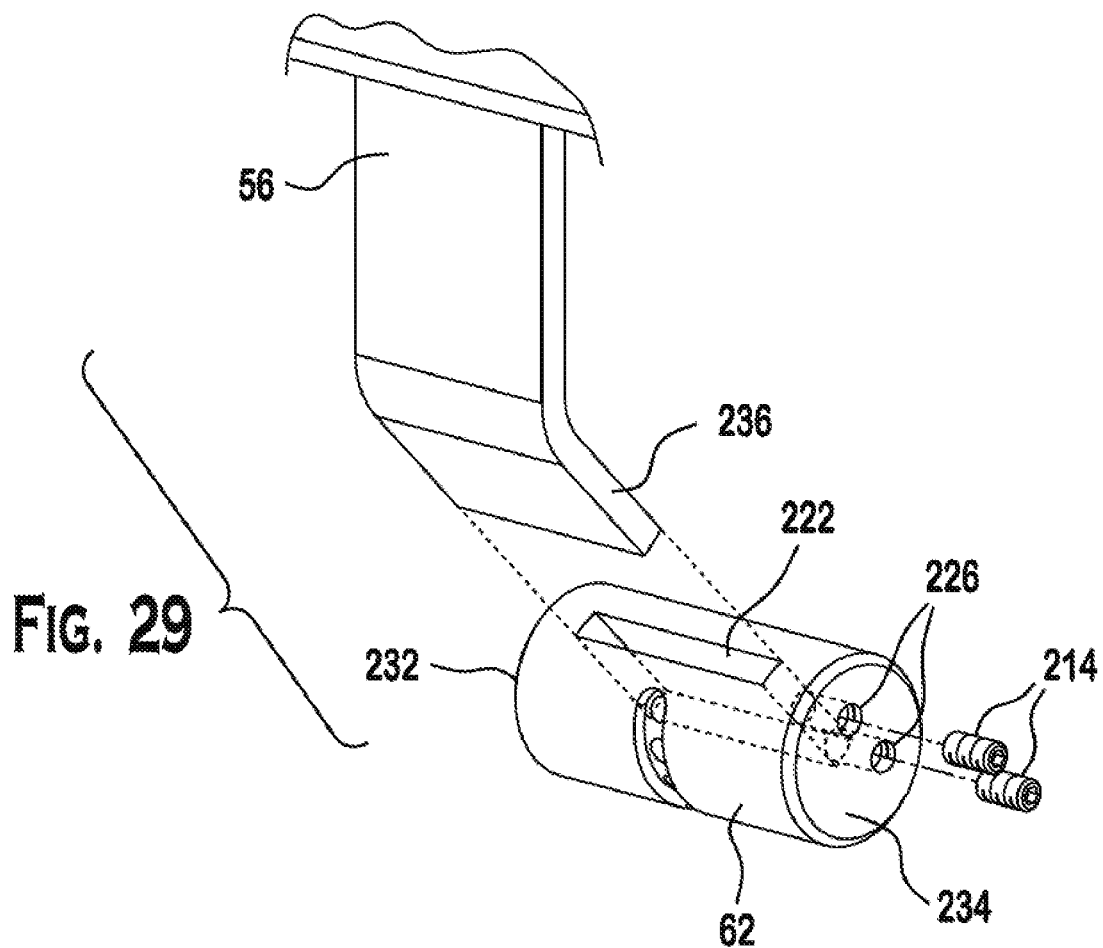
FIG. 29 is a perspective view of the indexing core 62 of the present invention illustrating an alternative method of detachably securing the first post segment 56 inside the core bore 222. The indexing core 62 preferably has first and second axial ends 232, 234, respectively. Fastener holes 226 are preferably positioned in the second axial end 234 to allow set screws 214 to bear against a lateral edge 236 of the first post segment 56.
Figure 30:
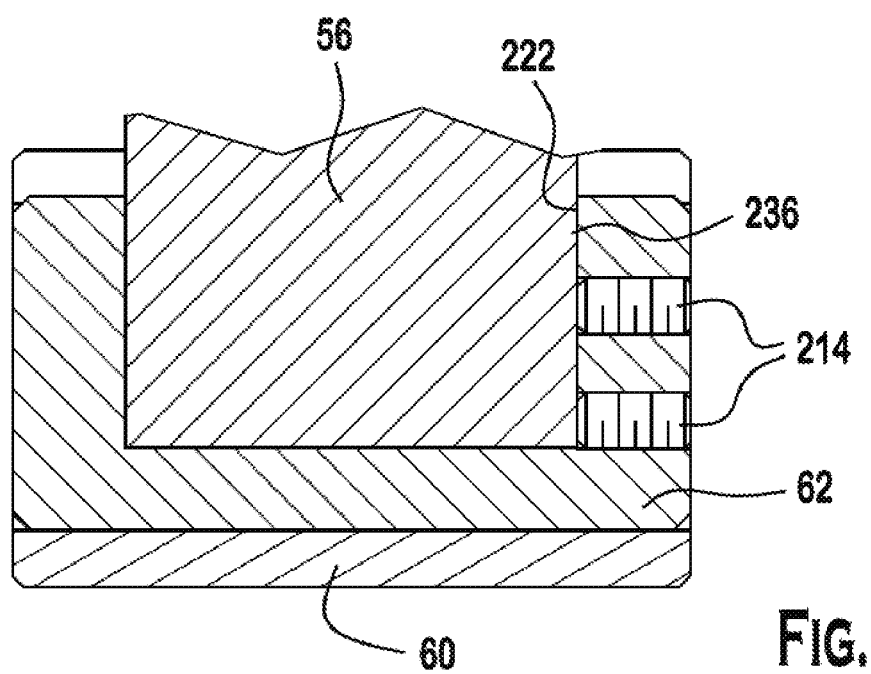
FIG. 30 is a broken away partial cross-sectional view illustrating the first post segment 56 inserted into the core bore 222 and secured therein by at least one set screw 214 engaging with the lateral edge 236 of the first post segment 56.

As shown in FIG. 29, an alternative method of detachably securing the first post segment 56 inside the core bore 222 includes securing a lateral edge 236 of the first post segment 56. The indexing core 62 preferably has first and second axial ends 232, 234, respectively. Fastener holes 226 are preferably positioned in the second axial end 234 to allow set screws 214 to bear against the lateral edge 236 of the first post segment 56. Referring now to FIG. 30 the first post segment 56 can inserted into core bore 126 and secured therein by at least one set screw 214 engaging with the lateral edge 236 of the first post segment 56.

As shown in FIG. 20, the connector mechanism 50 preferably includes a locking mechanism 64 is configured to detachably secure the position of the indexing core 62 relative to the sleeve 60 such that the angle between the first post segment 56 and the second post segment 58 can be secured in one of a plurality of positions. The locking mechanism 64 preferably, but not necessarily, includes: the biased pin assembly 76, the assembly bore 230, the core slot 92, and/or a plurality of pinholes 94, 96, 98, 100 in the indexing core 62.

The biased pin assembly 76 preferably includes a barrel 102 having first and second barrel axial ends 104, 106. The barrel 102 may have a threaded section 88 (also referred to as a threaded portion) and a non-threaded section 90 (also referred to as a boss portion). The non-threaded section 88 can include the first barrel axial end 104. The barrel 102 preferably has a central barrel axis 112 and includes the threaded portion 88, the boss portion 90, and the pin 82.

Figure 21:
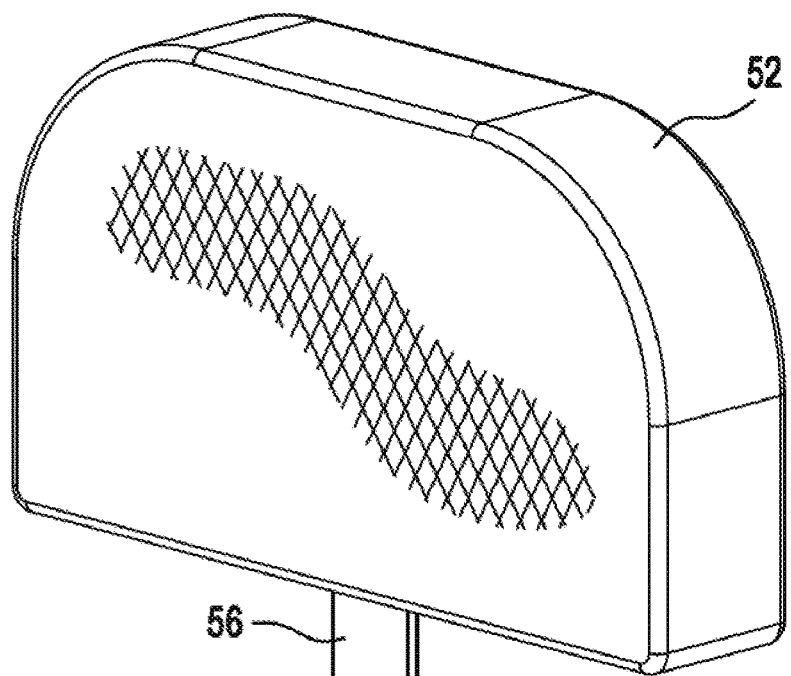
FIG. 21 is a front perspective view of the connector mechanism 50 of the present invention incorporated into a post of a back support structure 52 of a boat chair 190. The connector mechanism 50 can be retrofitted into an existing boat chair to form the resultant combination back support structure 52 and post shown in FIG. 21 or it can be manufactured with the boat chair such that the first post segment 56 and the second post segment 58 are permanently attached to the indexing core 62 and the sleeve 60, respectively.

It is preferable that the biased pin assembly 76 is inserted into the assembly bore 230 to secure the indexing core 62 within the sleeve 60. The biased pin assembly 76 is preferably, threadably engaged with the assembly bore 230. Referring to FIG. 21, the connector mechanism 50 can be retrofitted into an existing boat chair to form the resultant combination back support structure 52 and post or it can be manufactured with the boat chair such that the first post segment 56 and the second post segment 58 are permanently attached to the indexing core 62 and the sleeve 60, respectively.

Figure 22:
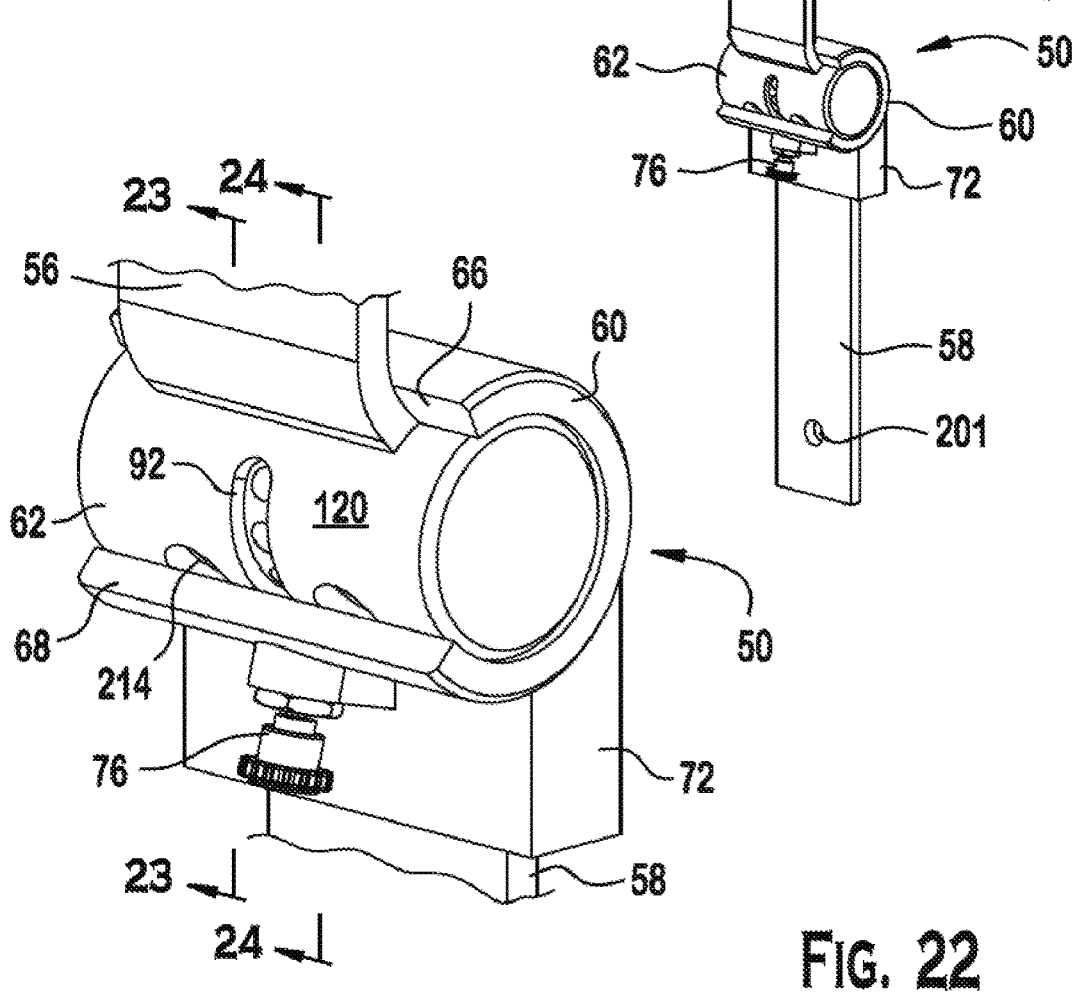
FIG. 22 is an enlarged broken away view of the structure of FIG. 21 illustrating the connector mechanism 50 with the first and second post segments 56, 58 detachably secured thereto and the biased pin assembly 76 engaged with one of the pinholes in the core slot 92.

As shown in FIGS. 22 and 23, the connector mechanism 50 can be configured with the first and second post segments 56, 58 detachably secured thereto and the biased pin assembly 76 engaged with one of the pinholes 94, 96, 98, 100 in the core slot 92. A set screw 214 can be located in the fastener hole 226 to secure the first post segment 56 within the indexing core 62. Another set screw 214 may be inserted in the faster hole in the mounting housing 72 to secure the second post segment 58 therein. The indexing core 62 may be rotated such that the first post segment 56 is in contact with or very close to the first sleeve wall 66 which results in the back support structure 52 being maintained in the most upright position.

Referring to FIG. 24, the biased pin assembly 76 preferably includes a barrel 102 that can be cylindrical in shape. A rod (which may be collectively formed by a first rod 78, a second rod 80, and a pin 82) may extend through the barrel 102 along the central barrel axis 112. The rod has a proximal rod end 114 and a distal rod end 116.

The rod preferably includes the pin 82 on the distal rod end 116. The rod may be displaceable along the central barrel axis 112 between a first rod position (illustrated in FIG. 25), in which the pin 82 is positioned within the barrel 102, and a second rod position (illustrated in FIG. 26), in which the pin 82 extends from the first barrel axial end 104.

The barrel 102 can include a threaded portion 88 and a boss portion 90. A knob 86 is preferably attached to a first rod 78 which is attached to a second rod 80. The second rod 80 may include a pin 82 located opposite to the knob 86. Those of ordinary skill in the art will appreciate from this disclosure that a single rod can be used with the knob without departing from the scope of the present invention. A biasing member 84, such as a spring or the like, can be positioned over a portion of the second rod 80 and configured to bias the pin 82 radially inwardly into the indexing core 62. That is, the biasing member 84 is preferably located within the barrel 102 and is configured to bias the rod toward the second rod position. It is preferred that the sleeve 60 and the indexing core 62 are configured such that when the locking mechanism is fully engaged with the sleeve 60 that the non-threaded section 90 of the barrel 102 is located within the core slot 92.

The threaded portion 88 of the barrel 102 may be threaded into the assembly bore 230. It is preferred that when the threaded portion 88 is properly inserted into the assembly bore 230 that at least a portion of the boss portion 90 protrudes from the sleeve 60 and extends into the core slot 92 of the indexing core 62. This prevents the indexing core 62 from sliding axially along the central axis 224 and axially misaligning the indexing core 62 with the sleeve 60 when the knob 86 of the biased pin assembly 76 is pulled radially outwardly. This feature is of extra benefit when adjusting the connector mechanism in choppy waters.

Referring to FIG. 25, the knob 86 of the biased pin assembly 76 is shown as displaced/moved radially outwardly to disengage the pin 82 from first pin hole 94 and with the first post segment 56 rotated counterclockwise such that the biased pin assembly 76 is brought into alignment with the base surface 124 of the core slot 92. Referring now to FIG. 26, the first post segment 56 has been further rotated counterclockwise relative the position illustrated in FIG. 25 until the pin 82 is in alignment with the second pin hole 96. Then the knob 86 was released and the biasing member 118 drove the pin 82 into engagement with the second pin hole 96. Thus FIGS. 25 and 26 illustrate two different positions into which a boat chair incorporating the connector mechanism 50 can be positioned. One advantage of this feature is that a user does not have to maintain outward force on the knob for the entire time that the first post segment is moved between adjacent pin holes 94, 96, 98, 100. Once the pin 82 has been withdrawn from a pin hole 94, 96, 98, 100 and the back support structure moved (clockwise or counterclockwise slightly) the knob can be released. This results in the biasing member 118 driving the pin 82 into engagement with a base 124 of the core slot 92. Then the back support structure 52 can continue to be rotated while the pin 82 rides along the base 124. Then, the biasing member 118 will preferably automatically drive the pin 82 into engagement with the next pinhole 94, 96, 98, 100 that is brought into alignment with the biased pin assembly 76.

Figure 27:
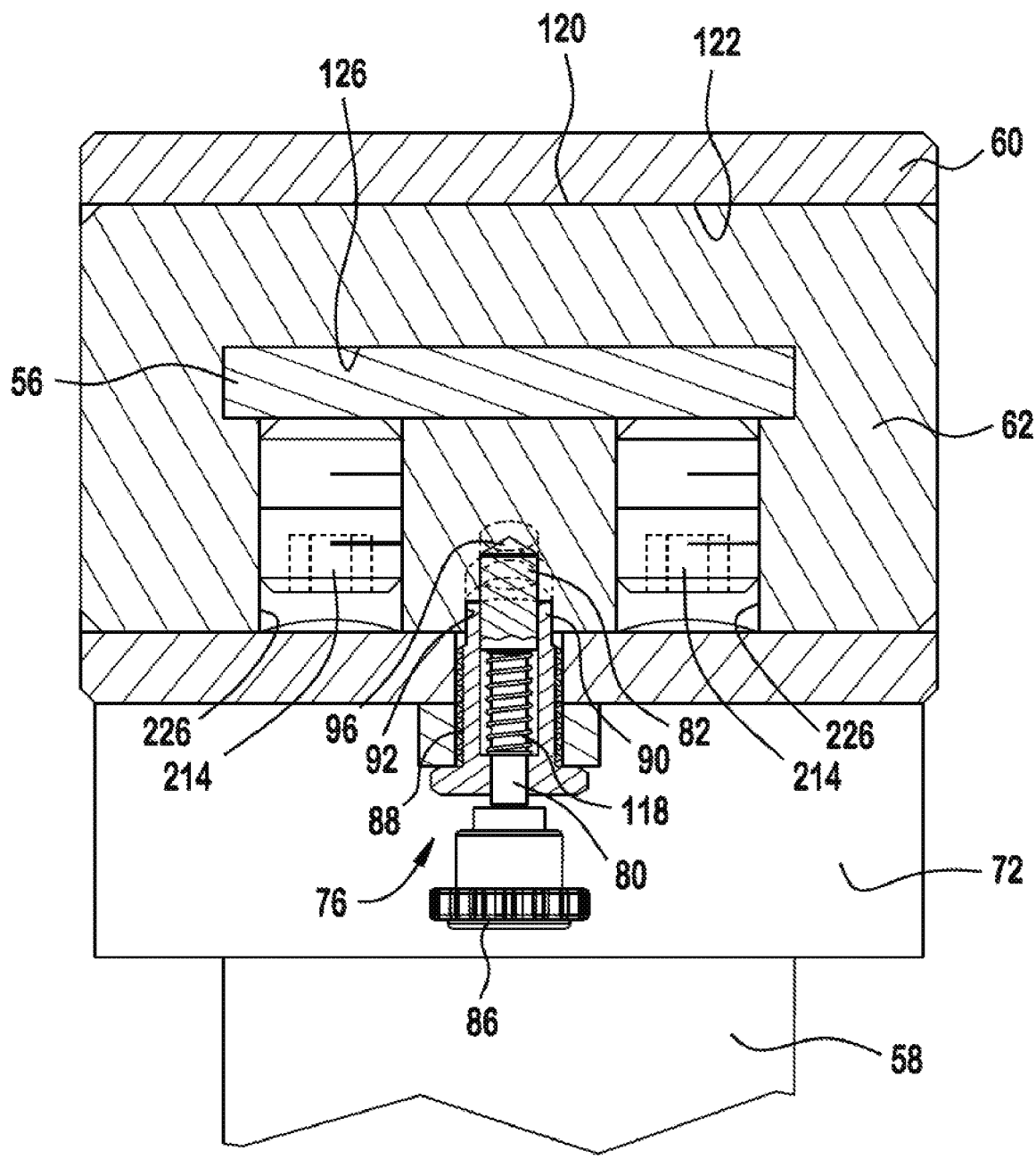
FIG. 27 is a cross-sectional view of a preferred embodiment of the connector mechanism 50 taken through a plane aligned with the biased assembly pin 76.
Figure 28:
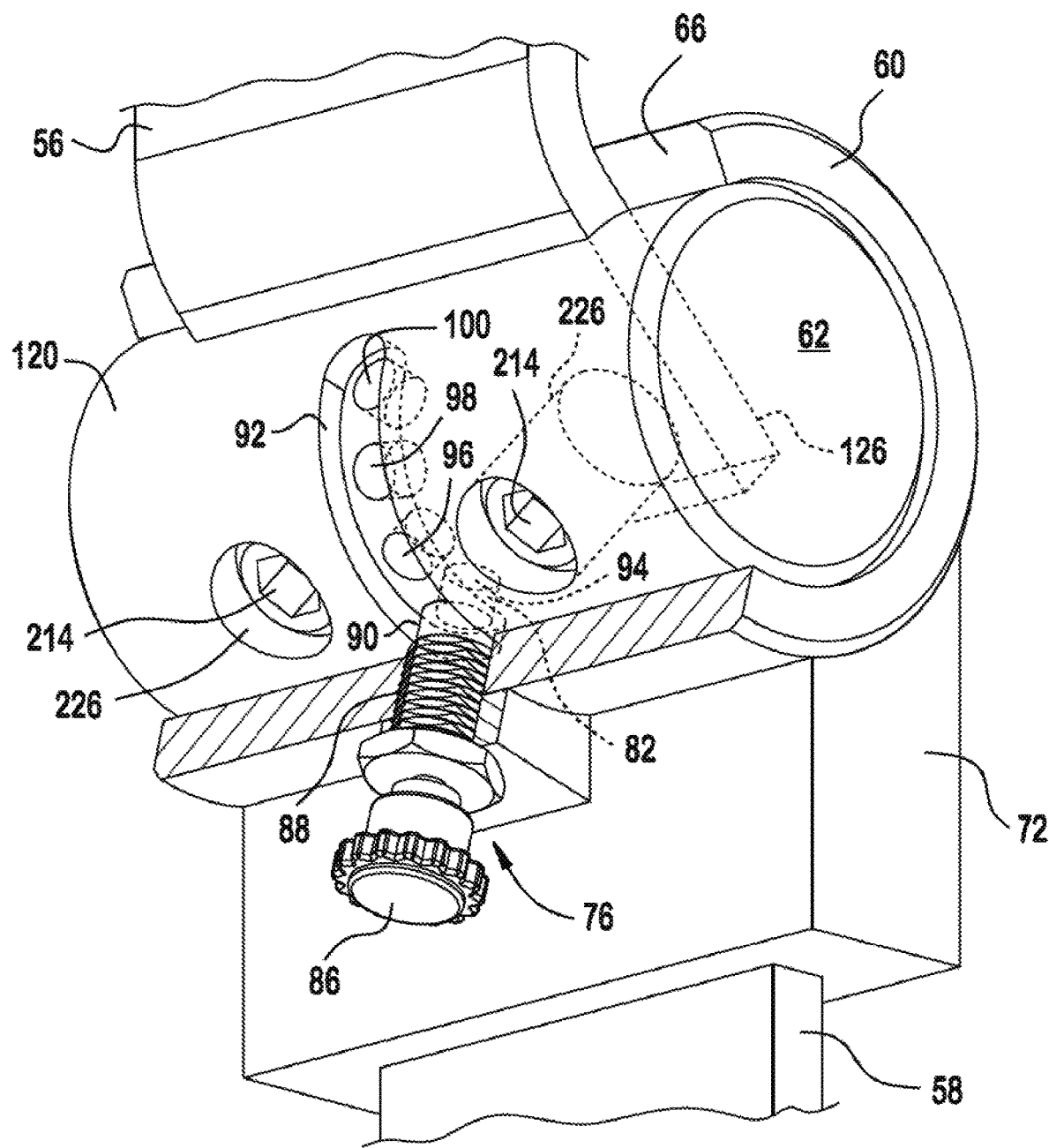
FIG. 28 is a bottom partially broken away perspective view of the connector mechanism 50 according to a preferred embodiment of the present invention. The boss portion 90 of the biased pin assembly 76 is positioned within the slot groove 92 such that the biased pin assembly 76 and the slot groove 92 provide a guide track for the indexing core 62 during rotation to prevent axial misalignment along the central axis 224 when the indexing boss 62 and the sleeve 60 are rotated relative to each other. Put another way, the axial position along the central axis 224 of the indexing core 62 is properly maintained via the engagement of the boss portion 90 of the biased pin assembly 76 with the core slot 92. This results in the motion of the indexing core 62 being tracked. It is preferable that engagement of the boss portion 90 of the biased pin assembly 76 with the core slot 92 also prevents the accidental disengagement of the biased pin assembly 76 from the indexing core 62 when the pin 82 is withdrawn from the plurality of holes 94, 96, 98, 100.

As shown in FIGS. 27 and 28, the boss portion 90 of the biased pin assembly 76 is preferably positioned within the slot groove 92 such that the biased pin assembly 76 and the slot groove 92 result in the indexing core 62 being tracked during rotation to prevent axial misalignment along the central axis 224 when the indexing boss 62 and the sleeve 60 are rotated relative to each other. Put another way, the axial position along the central axis 224 of the indexing core 62 is tracked via the engagement of the boss portion 90 of the biased pin assembly 76 with the core slot 92. This results in the motion of the indexing core 62 being tracked. It is preferable that this also prevents the accidental disengagement of the biased pin assembly 76 from the indexing core 62 when the pin 82 is withdrawn from the plurality of holes 94, 96, 98, 100.

Figure 31:
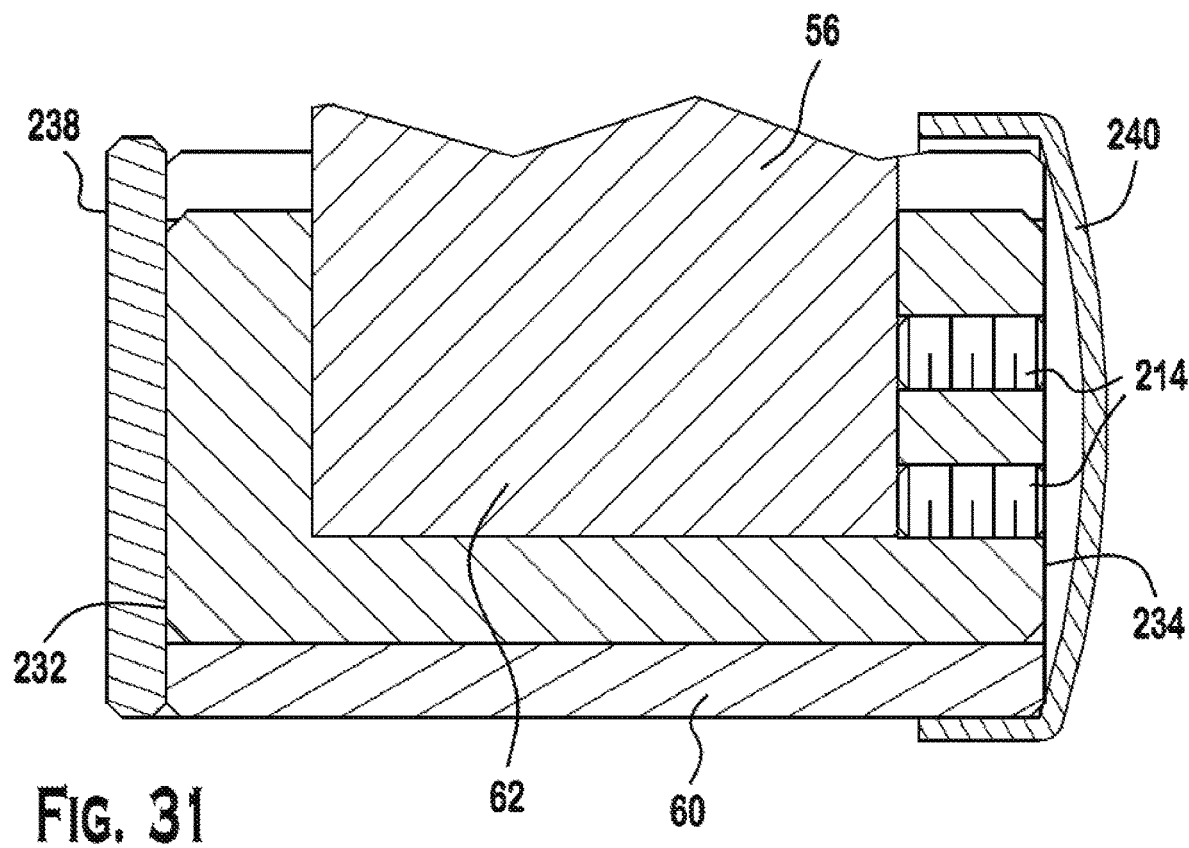
FIG. 31 is a broken away partial cross-sectional view of the connector mechanism 50 of FIG. 30. A plate 238 is preferably secured to the sleeve 60. The plate 238 may be formed of metal, rubber, or any other suitable material without departing from the scope of the present invention. A snap fit cap 240 is preferably positioned over the second axial and 234 of the connector mechanism 50.
Figure 32:
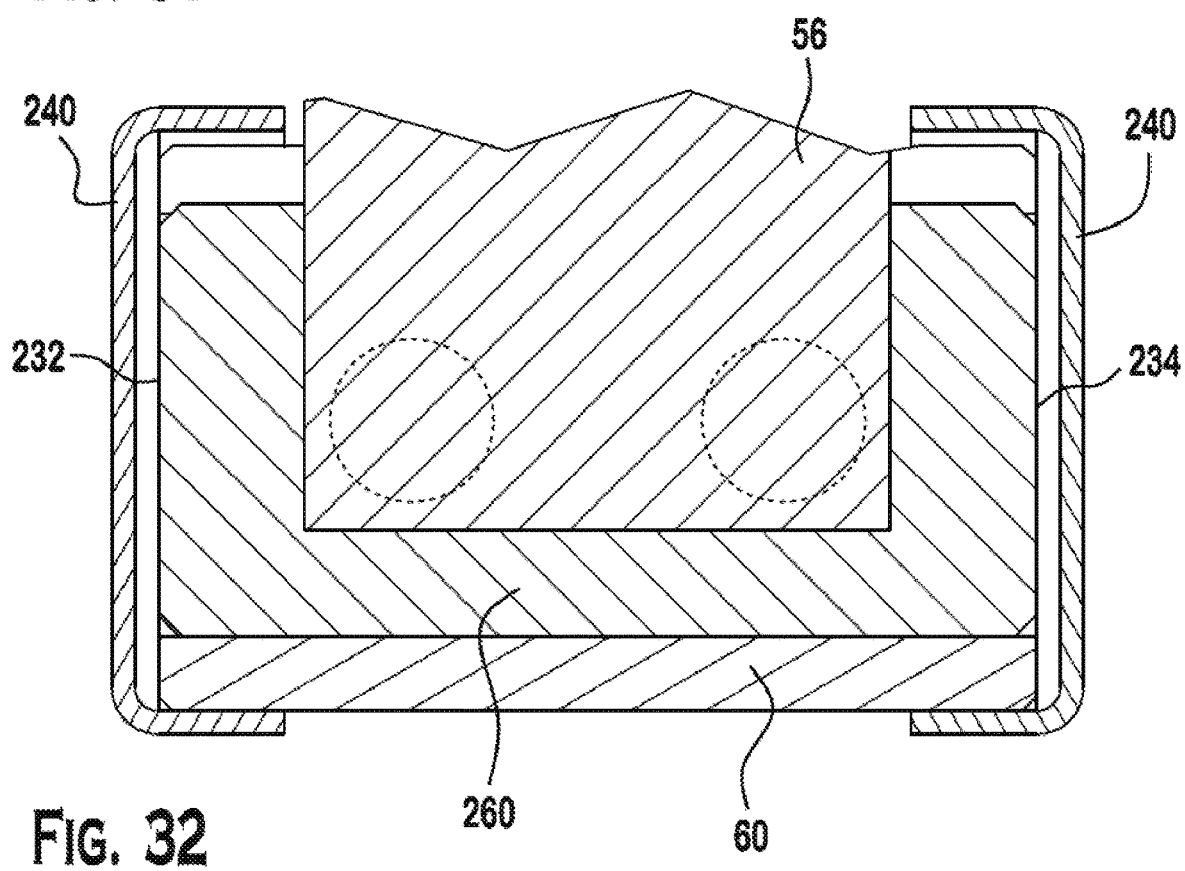
FIG. 32 is a cross-sectional view of the connector mechanism 50 illustrating the first and second axial ends 232, 234 being covered by snap fit caps 240.

Referring now to FIGS. 31 and 32, it is preferable that covers 238, 240 are positionable over the first and second axial ends 232, 234 of the indexing core 62 to reduce the amount of contaminants that get on the sliding surfaces of the indexing core 62 and the sleeve 60. Additionally, covers 238, 240 can reduce the incidence of pinching of the user's hand during manipulation of the connector mechanism 50. While two types of covers 238, 240 are shown, those of ordinary skill in the art will appreciate from this disclosure that any suitable covers may be used or the covers 238, 240 may be omitted entirely without departing from the scope of the present invention, Referring to FIG. 31, a plate 238 is preferably secured to the sleeve 60. The plate 238 may be formed of metal, rubber, or any other suitable material without departing from the scope of the present invention. A snap fit cap 240 is preferably positioned over the second axial end 234 of the connector mechanism 50. As shown in FIG. 32, the first and second axial ends 232, 234 may be covered by snap fit caps 240 or the like.

Figure 33:
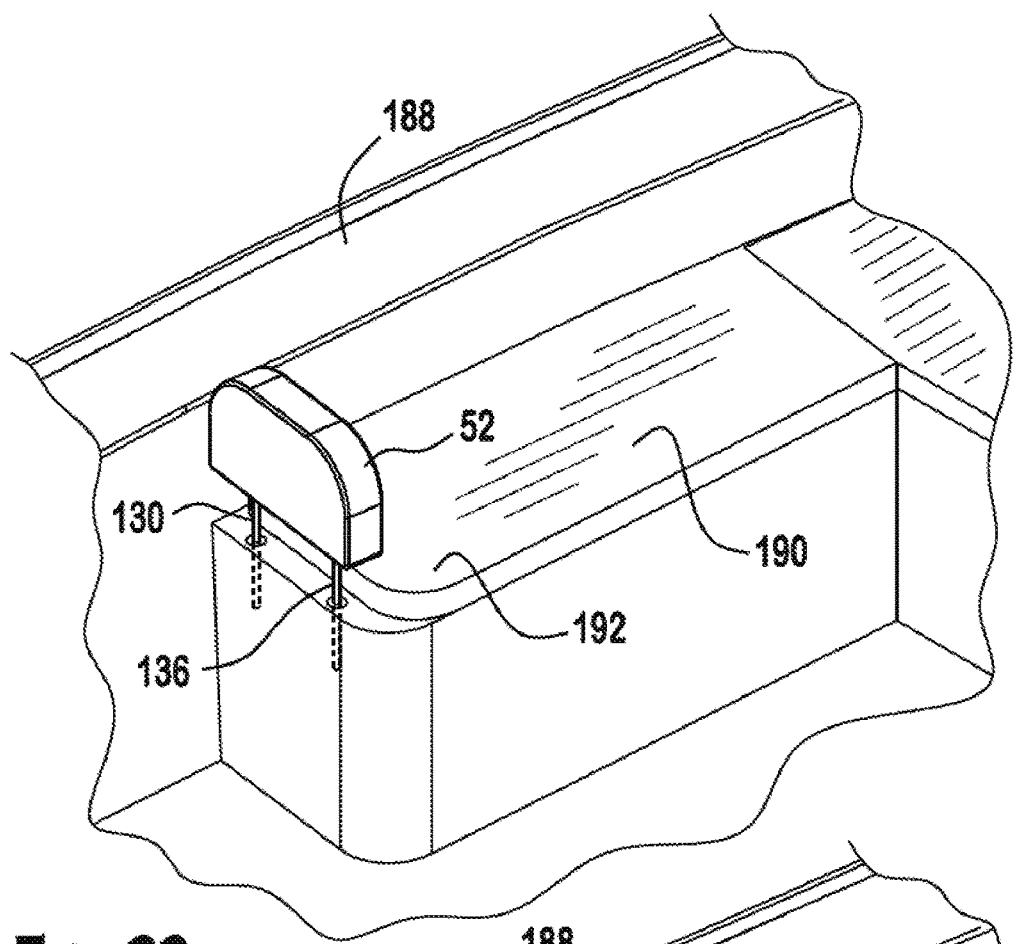
FIG. 33 is a perspective view of a back support structure 52 of a boat chair 190 which has two posts connecting it to a seat support structure 192. The first and second posts 130, 136 preferably extend into a portion of the seat support structure 192, While particular configurations of the boat chair 190 are shown in FIGS. 1 and 33, those of ordinary skill in the art will appreciate from this disclosure that the connector mechanism 50 and/or the first and second connector subassemblies 240, 242 can be used with any style or configuration of boat chair 190 without departing from the scope of the present invention.
Figure 34:
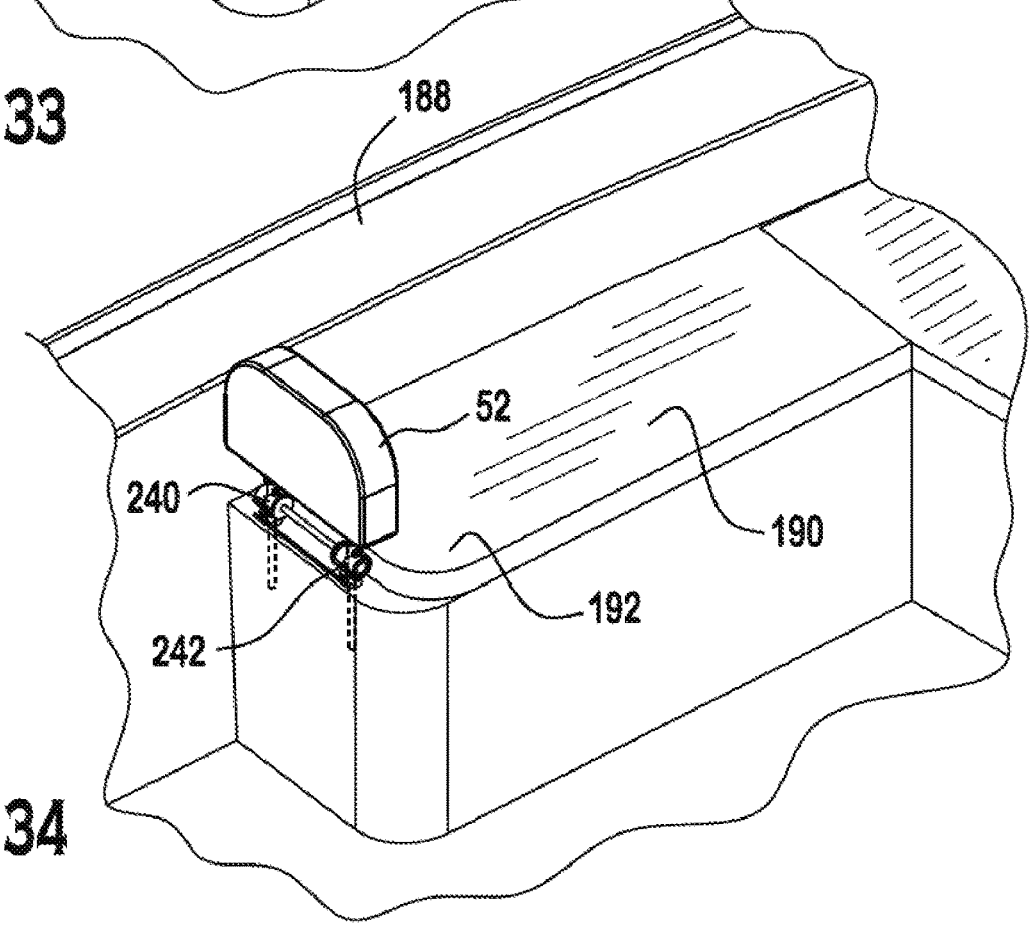
FIG. 34 is a perspective view of the connector mechanism 0 which preferably, includes first and second connector subassemblies 240, 242 integrated into the first and second posts 130, 136 of the boat chair 190 according to a second preferred embodiment of the present invention.

Referring to FIG. 33, a back support structure 52 of a boat chair 190 has two posts connecting it to a seat support structure 192. The first and second posts 130, 136 preferably extend into a portion of the seat support structure 192, While particular configurations of boat chairs 190 are shown in FIGS. 1 and 33, those of ordinary skill in the art will appreciate from this disclosure that the connector mechanism 50 can be used with any style or configuration of boat chair 190 without departing from the scope of the present invention.

As shown in FIG. 34, a second preferred embodiment of the present invention is directed to a connector mechanism 50 for a back support structure 52 of a boat chair 190 with multiple posts. The back support structure 52 has a first post 130 and a second post 136 that are configured to connect to the seat support structure 192. The first post 130 includes a first post segment 132 and a second post segment 134 and the second post 136 includes a third post segment 138 and a fourth post segment 140.

Figure 37:
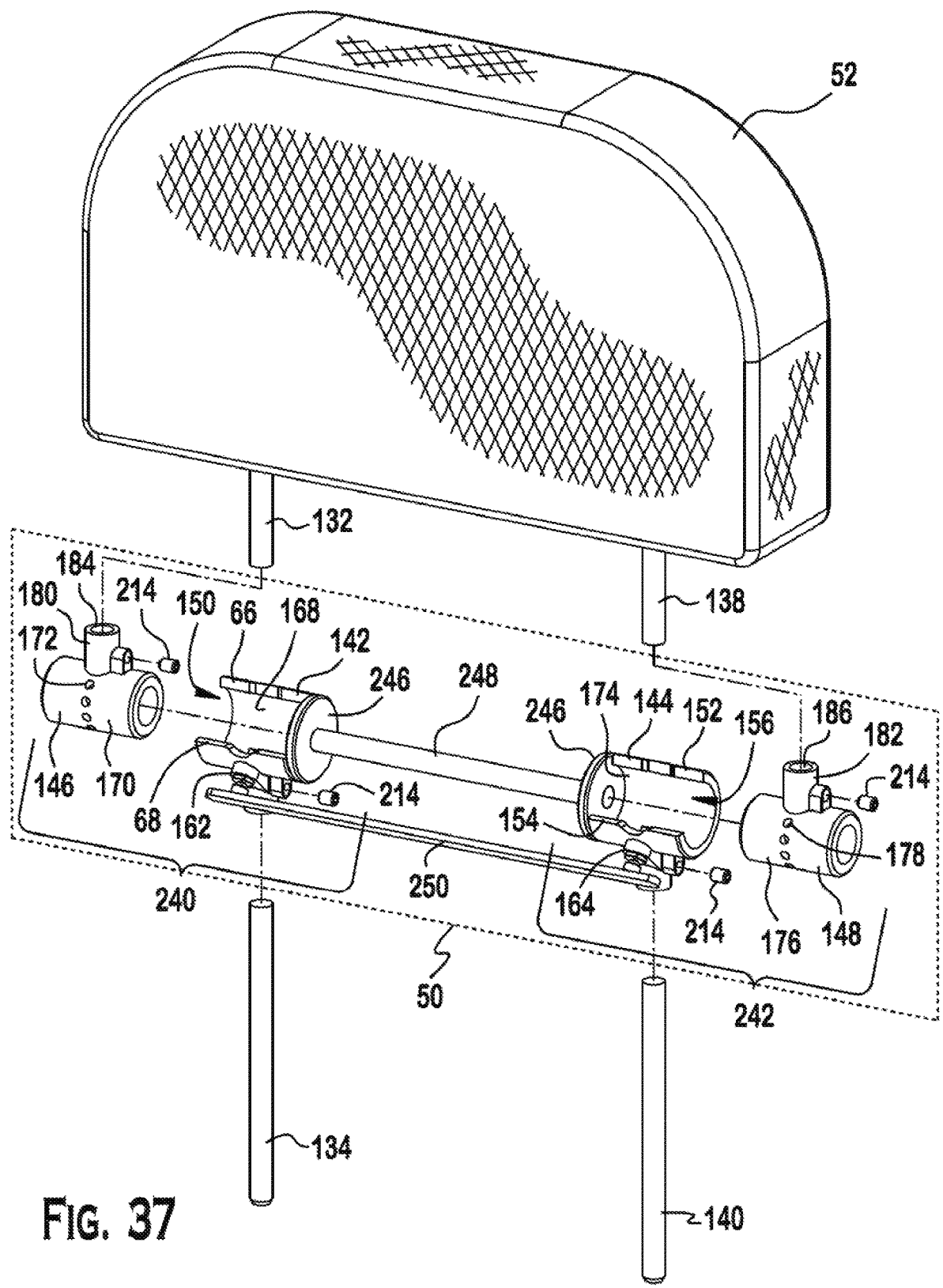
FIG. 37 is an exploded perspective view illustrating the assembly of the back support structure and the cut first and second posts 130, 136 with the second embodiment of the connector mechanism 50 according to the present invention. The first and second sleeves 142, 144 each preferably include a lateral plate 246. The lateral plates are connected via a spacer rod 248. The spacer rod 248 maintains the proper distance between the first and second connector subassemblies 240, 242 and maintains the first and second connector subassemblies 240, 242 in an identical angular alignment. The first sleeve 142 of the first connector subassembly 240 preferably includes first and second sleeve walls 66, 68 which define a first circumferential sleeve gap 150. The first sleeve 142 preferably includes a first biased pin assembly 162. The first inner sleeve surface 168 preferably slides over the first outer core surface 170 of the first indexing core 146 and is in direct sliding contact therewith. The first indexing core 146 preferably includes a first plurality of pin holes 172. The second connector subassembly 242 includes a second sleeve 144 having a third sleeve wall 152 and a fourth sleeve wall 154 defining a second circumferential sleeve gap 156. The second connector subassembly 242 also includes a second indexing core 148 having a second outer core surface 176 defining a second plurality of holes 178. The second indexing core 148 preferably includes a second core extension 182 which defines a second core bore 186. The first and second biased pin assemblies are preferably linked and co-actuated via a control bar 250.

The connector mechanism 50 preferably includes first and second connector subassemblies 240, 242, first and second biased pin assemblies 162, 164, the connector rod 248, and/or the control bar 250. Accordingly, the connector mechanism can be used with any number of posts connected to the seat support structure 52. For example, if four posts connect the back support structure 52 to the seat support structure, then the connector mechanism 50 could incorporate four connector subassemblies without departing from the scope of the present invention. As shown in FIG. 37, the connector mechanism 50 preferably preferably includes first and second sleeves 142, 144 enclosing the central axis 224. The first sleeve 142 can be configured to engage the second post segment 134 and the second sleeve 144 may be configured to engage the fourth post segment 140.

Figure 35:
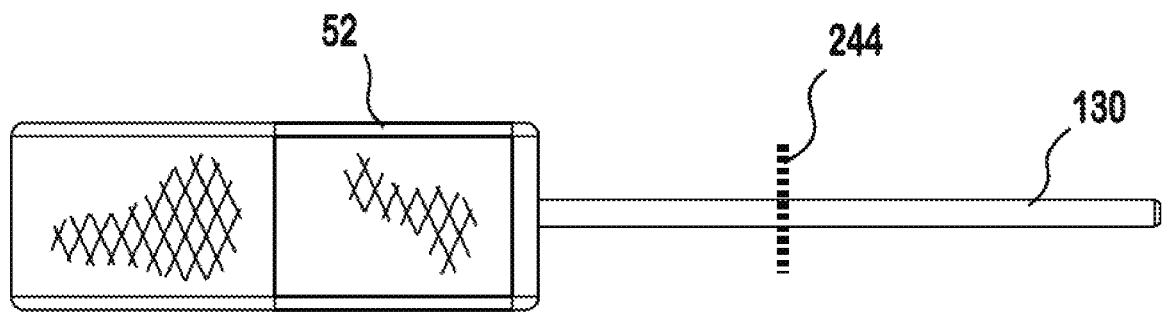
FIG. 35 is a side elevational view of the back support structure 52 with the first and second inflexible posts extending rightwardly therefrom. The second post 136 is obscured from view by the first post 130. Cut line 244 illustrates where to cut each of the posts 130, 136 along their length to retrofit a boat chair to incorporate the first and second connector subassemblies 240, 242 of the connector mechanism 50.

Referring now to FIG. 35, the back support structure 52 is shown with the first and second posts 130, 136 extending rightwardly therefrom. The second post 136 is obscured from view by the first post 130. Cut lines 244 illustrates where to cut each of the posts 130, 136 along their length to retrofit a boat chair 190 to incorporate the connector mechanism 50 and the associated first and second connector subassemblies 240, 242. Those of ordinary skill in the art will appreciate from this disclosure that the boat chair 190 can be originally manufactured with the connector mechanisms 240, 242 permanently installed therein.

Figure 36:
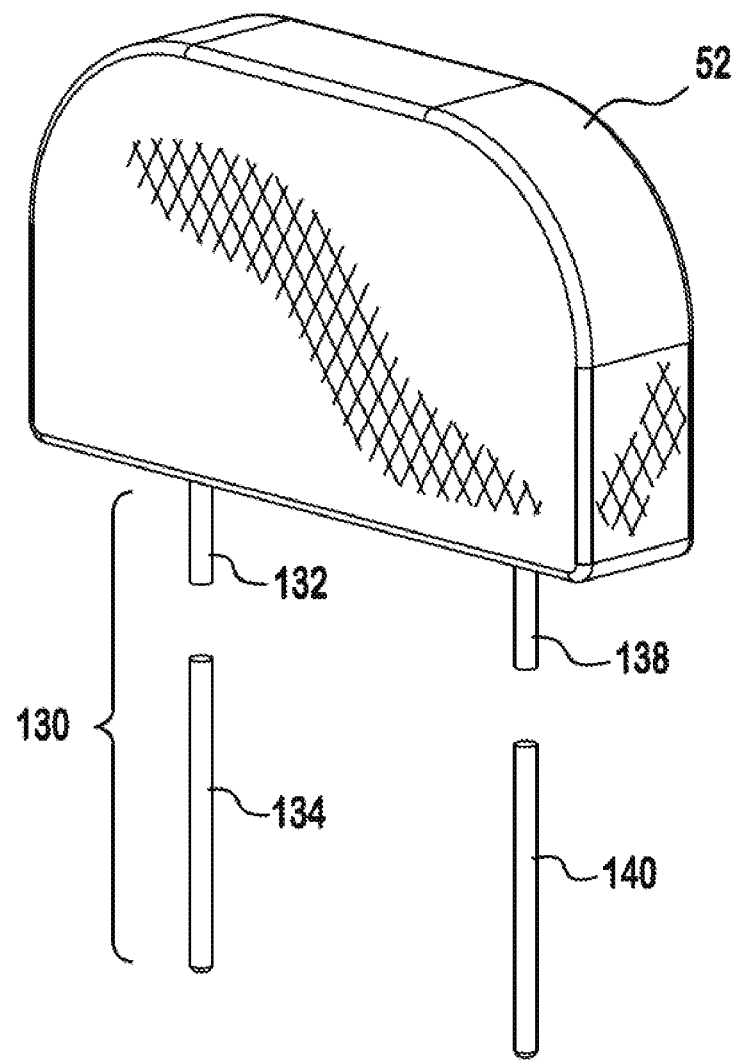
FIG. 36 is a perspective view of the back support structure and first and second posts 130, 136 of the present invention after the first and second posts 130, 136 have been cut to form a first post segment 132, a second post segment 134, a third post segment 138, and a fourth post segment 140.

FIG. 36 illustrates first and second posts 130, 136 after the first and second posts 130, 136 have been cut to form first post segment 132, second post segment 134, third post segment 138, and forth post segment 140.

The connector mechanism 50 preferably includes first and second indexing cores 146, 148 that are rotatably positioned within the first and second sleeves 142, 144, respectively, for rotation about the central axis. The first indexing core is configured to engage the first post segment 132 and the second indexing core is configured to engage the third post segment 138.

As shown in FIG. 37, the first and second sleeves 142, 144 each preferably include a lateral plate 246. The lateral plates are connected via the spacer rod 248. The spacer rod 248 maintains the proper distance between the first and second connector subassemblies 240, 242 and maintain the first and second connector subassemblies 240, 242 in a proper angular alignment.

Figure 38:
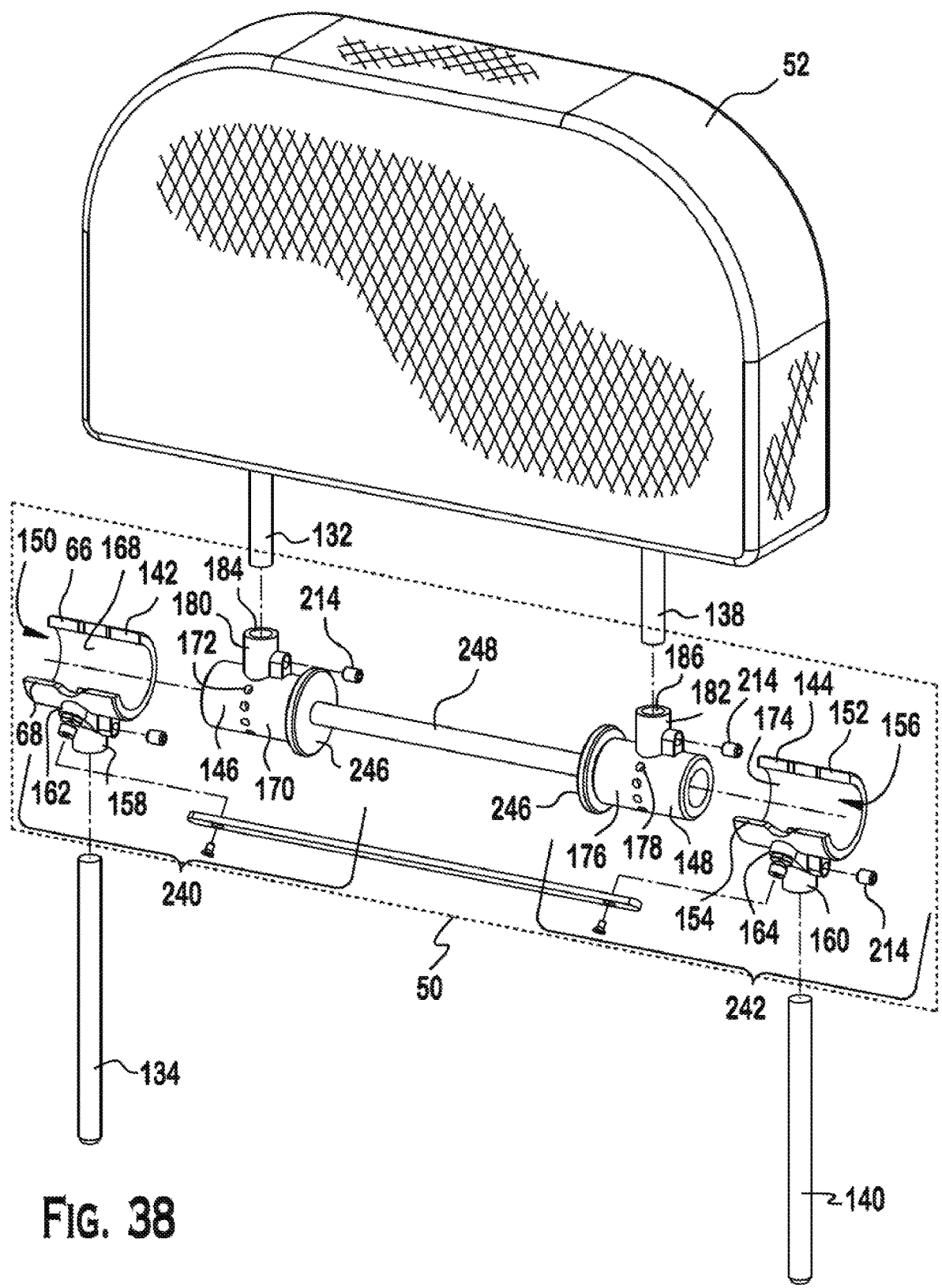
FIG. 38 is a perspective exploded view of the connector mechanism 50 according to the second preferred embodiment of the present invention. The illustrated connector mechanism is similar to that of FIG. 7 except for the plates 246 are located on the first and second indexing cores 146, 148.
Figure 43:
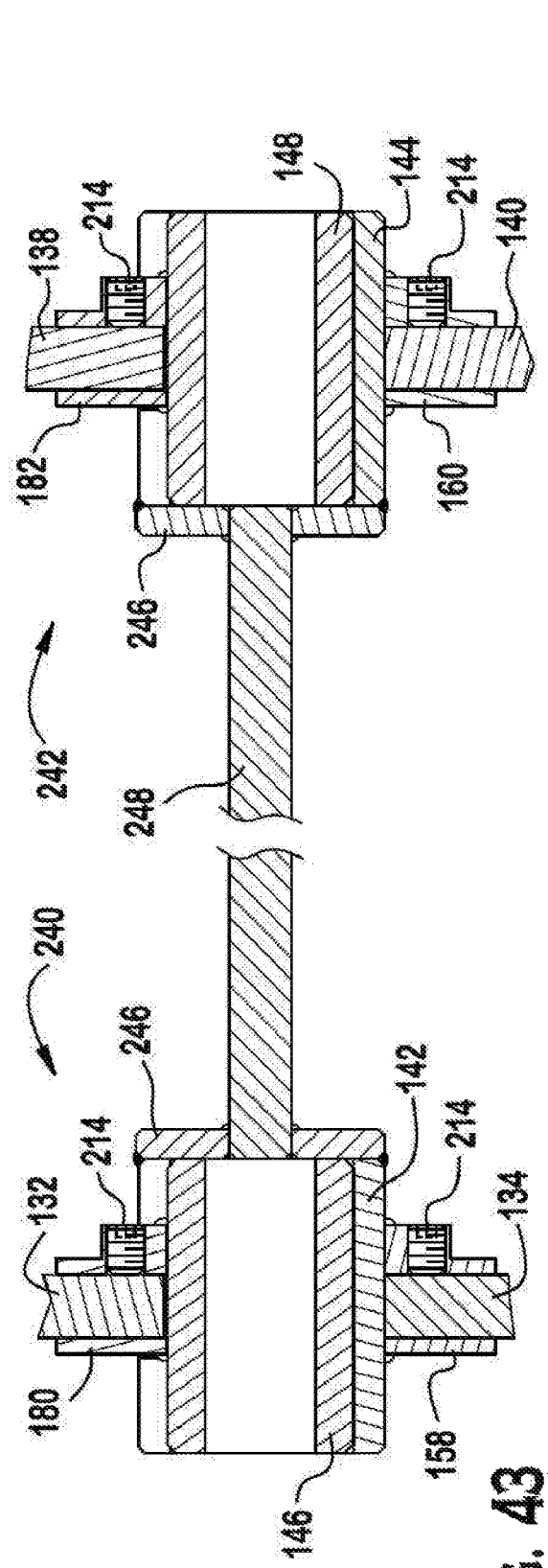
FIG. 43 illustrates the first and second connector subassemblies 240, 242 of the present invention with the plates 246 attached to the first and second sleeves 142, 144.
Figure 44:
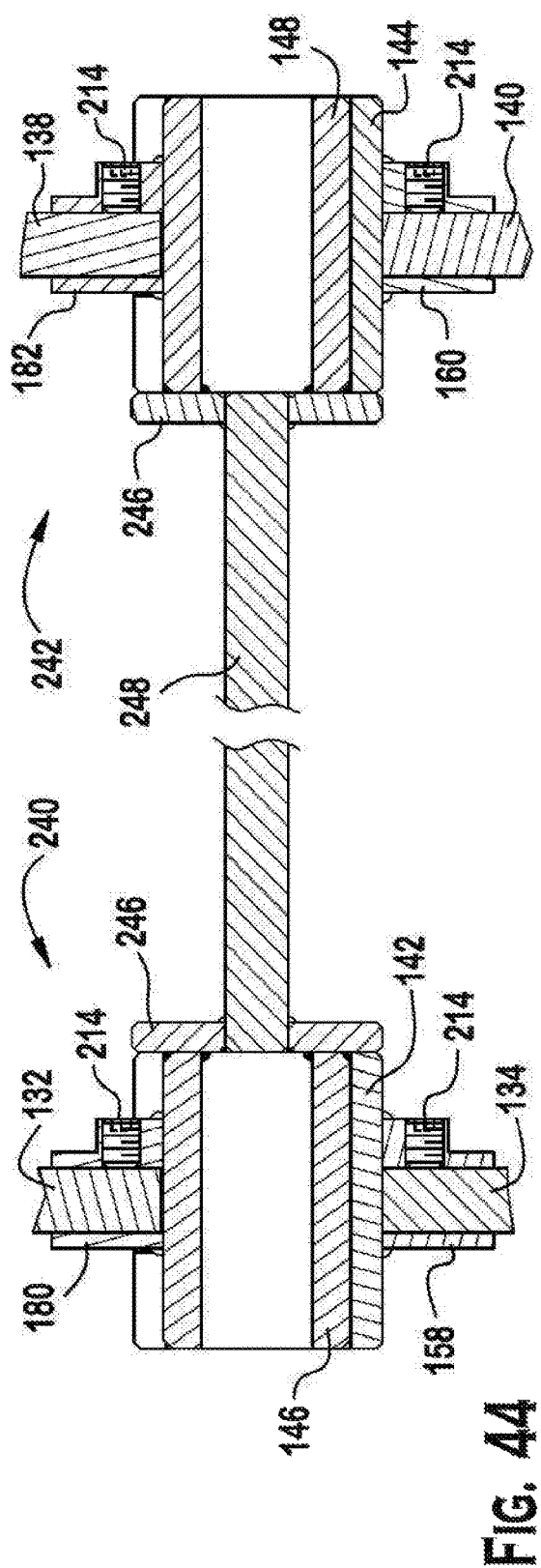
FIG. 44 illustrates the first and second connector and mechanisms 240, 242 of the present invention with the plates 246 attached to the first and second indexing cores 146, 148.

The first sleeve 142 of the first connector subassembly 240 preferably includes first and second sleeve walls 66, 68 which define a first circumferential sleeve gap 150. The first sleeve 142 preferably includes a first biased pin assembly 162. The first inner sleeve surface 168 preferably slides over the first outer core surface 170 of the first indexing core 146 and is in direct sliding contact therewith. The first indexing core 146 preferably includes a first plurality of pin holes 172. The second connector subassembly 242 includes a second sleeve 144 having a third sleeve wall 152 and a fourth sleeve wall 154 defining a second circumferential sleeve gap 156. The first indexing core 146 preferably includes a first core extension 180 which defines a first core bore 184 that can be configured to detachably receive the first post segment 132 therein. The second connector subassembly 242 also includes a second indexing core 148 having a second outer core surface 176 defining a second plurality of holes 178. The second indexing core 148 preferably, includes a second core extension 182 which defines a second core bore 186 which may be configured to detachably receive the third post segment 138 therein. The first and second biased pin assemblies are preferably linked and co-actuated via a control bar 250. Referring to FIG. 38, the plates 246 may be located on the first and second indexing cores 146, 148.

Referring to FIGS. 37 and 42, the locking mechanism can be configured to detachably secure the position of the first indexing core 146 relative to the first sleeve 142 and to detachably secure the position of second indexing core 148 relative to the second sleeve 144 such that a first angle between the first post segment 132 and the second post segment 134 and such that a second angle between the third post segment 138 and the fourth post segment 140 can be secured in one of a plurality of positions.

It is preferred that the first sleeve 142, when viewed in cross section perpendicular to the central axis, has first and second sleeve walls 66, 68 defining a first circumferential sleeve gap 150. The connector mechanism 50 can be configured for the first post segment 132 to be engaged with the first indexing core 146 and to extend through the first circumferential sleeve gap 150. The second sleeve 144, when viewed in cross section perpendicular to the central axis, has third and fourth sleeve walls defining a second circumferential sleeve gap, the connector mechanism being configured for the third post segment to be engaged with the second indexing core and to extend through the second circumferential sleeve gap.

As shown in FIG. 38, a first mounting housing 158 may be disposed on the first sleeve 142 and configured to engage the second post segment 134. A second mounting housing 160 can be disposed on the second sleeve 144 and configured to engage the fourth post segment 140.

Referring now to FIG. 42, a preferred locking mechanism includes first and second biased pin assemblies 162, 164 which each preferably include the following structure. A barrel 102 having first and second barrel axial ends 104, 106. The barrel preferably has a threaded section/portion 88 but may possibly omit a smooth mounting section/portion therealong. The barrel 102 preferably has a central barrel axis 112. A rod may extend through the barrel 102 along the central barrel axis 112. The rod may having a proximal rod end 114 and a distal rod end 116. The rod can include a pin 82 on the distal rod end 116. It is preferred that the rod is displaceable along the central barrel axis 112 between a first rod position (similar to that shown in FIG. 25), in which the pin 82 is positioned within the barrel 102, and a second rod position (similar to that shown in FIG. 26), in which the pin 82 extends from the first barrel axial end 104. A biasing member 84 may be located within the barrel 102 and can be configured to bias the rod toward the second rod position.

Referring again to FIG. 37, the first and second sleeves 142, 144 preferably have first and second inner sleeve surfaces 168, 174, respectively. First and second indexing cores 146, 148 may have first and second outer core surfaces 170, 176, respectively, such that the first inner sleeve surface 168 overlies and is in direct sliding contact with the first outer core surface 170 and the second inner sleeve surface 174 overlies and is in direct sliding contact with the second outer core surface 176. The first and second outer core surfaces preferably defining first and second pluralities of pin holes, respectively.

The first outer core surface 170 can define a first core bore 184 therein. The first core bore 184 may be configured to slidingly receive the first post segment 132. The first mounting housing 158 can define a first housing bore configured to slidingly receive the second post segment 134. The second outer core surface 176 preferably defines a second core bore 186 therein. The second core bore 186 being configured to slidingly receive the third post segment 138. The second mounting housing 160 can define a second housing bore configured to slidingly receive the fourth post segment 140.

The advantageous connector mechanisms 50 or the present invention allow boat chairs, regardless of the number of posts which connect the back support structure to the seat support structure to be made multi-positional to maximize boat functionality and enjoyment. Additionally, the connector mechanisms 50 of the present invention can be used with boat chairs that have slat structures that are hinged together without the use of posts. Instead of the connector mechanisms 50 attaching to post segments. The connector mechanisms can have plates attached thereto that can be fastened to the rear of slats used in boat chairs.

It is recognized by those skilled in the art that changes may be made to the above described methods without departing from the broad inventive concept thereof. For example, many of the detachable connections are described and shown as incorporating set screws. However, any, other connection method (detachable or not) can be used such as welds, rivets, clamps, snap rings, or the like without departing from the scope of the present invention. It is understood, therefore, that this invention is not limited to the particular embodiments disclosed, but is intended to cover all modifications which are within the spirit and scope of the invention as defined by the above specification, the appended claims and/or shown in the attached drawings.

What is claimed is:

1. A connector mechanism for a back support structure of a boat chair, the back support structure having a post configured to connect to a seat on a boat, the post including a first post segment and a second post segment, the connector mechanism comprising:
    a sleeve enclosing a central axis, the sleeve being configured to engage the second post segment, wherein the sleeve, when viewed in cross section perpendicular to the central axis, has first and second sleeve walls defining a circumferential sleeve gap, the connector mechanism being configured for the first post segment to be engaged with the indexing core and to extend through the circumferential sleeve gap;
    an indexing core rotatably positioned within the sleeve for rotation about the central axis, the indexing core being configured to engage the first post segment; and
    a locking mechanism configured to detachably secure the position of the indexing core relative to the sleeve such that an angle between the first post segment and the second post segment can be secured in one of a plurality of positions.

2. The connector mechanism of claim 1, further comprising a mounting housing disposed on the sleeve and configured to engage the second post segment.

3. The connector mechanism of claim 1, wherein the locking mechanism comprises:
    a biased pin assembly having:
    a barrel having first and second barrel axial ends, the barrel having a threaded section and a non-threaded section, the non-threaded section including the first barrel axial end, the barrel having a central barrel axis;
    a rod extending through the barrel along the central barrel axis, the rod having a proximal rod end and a distal rod end;
    the rod comprising a pin on the proximal rod end, the rod being displaceable along the central barrel axis between a first rod position, in which the pin is positioned within the barrel, and a second rod position, in which the pin extends from the first barrel axial end; and
    a biasing member located within the barrel and configured to bias the rod toward the second rod position.

4. The connector mechanism of claim 3, further comprising:
    the sleeve having an inner sleeve surface;
    the indexing core further having an outer core surface, wherein the inner sleeve surface overlies and is in direct sliding contact with the outer sleeve surface;
    the outer core surface defining a core slot therein, the core slot extending circumferentially about the indexing core when the indexing core is viewed in cross section in a direction perpendicular to the central axis, the core slot having a base surface defining a plurality of pin holes; and
    wherein the sleeve and indexing core are configured such that when the locking mechanism is fully engaged with the sleeve, the non-threaded section of the barrel is located within the core slot.

5. The connector mechanism of claim 4, further comprising the outer core surface defining a core bore therein, the core bore being configured to slidingly receive the first post segment, the mounting housing defining a housing bore configured to slidingly receive the second post segment.

6. A boat chair, comprising the connector mechanism of claim 5, wherein the threaded section of the barrel is engaged with the sleeve and the non-threaded section of the barrel is positioned within the core slot of the indexing core, the first post segment is detachable secured in the core bore, and the second post segment is detachably fixed within the housing bore.

7. A boat chair, comprising the connector mechanism of claim 4, wherein the threaded section of the barrel is engaged with the sleeve and the non-threaded section of the barrel is positioned within the core slot of the indexing core, the first post segment is fixed to the core bore, and the second post segment is fixed to the housing bore.

8. A back support structure of a boat chair, the back support structure comprising:
    a post configured to connect to a seat on a boat, the post including a first post segment and a second post segment,
    a connector mechanism disposed on the first post segment and the second post segment, the connector mechanism configured to allow rotation of the first post segment about a central axis relative to the second post segment,
    a locking mechanism configured to detachably secure the position of the post such that an angle between the first post segment and the second post segment can be secured in one of a plurality of positions;
    a sleeve enclosing a central axis, the sleeve being configured to engage the second post segment; and
    an indexing core rotatably positioned within the sleeve for rotation about the central axis, the indexing core being configured to engage the first post segment.

9. The back support structure of claim 8, wherein the plurality of positions includes at least two configurations suitable for at least one of seating and/or laying thereon.

* * * * *